(12) United States Patent
Yang

(10) Patent No.: US 7,062,911 B2
(45) Date of Patent: Jun. 20, 2006

(54) NATURAL THERMO-CARRIER HEAT RELEASE SYSTEM

(76) Inventor: Tai-Her Yang, No. 59, Chung Hsing 8 St., Si-Hu Town, Dzan-Hwa (TW)

(*) Notice: Subject to any disclaimer, the term of this patent is extended or adjusted under 35 U.S.C. 154(b) by 0 days.

(21) Appl. No.: 10/413,395

(22) Filed: Apr. 15, 2003

(65) Prior Publication Data
US 2004/0206084 A1 Oct. 21, 2004

(51) Int. Cl.
F03G 7/04 (2006.01)

(52) U.S. Cl. .............. 60/641.6; 60/641.7; 60/641.1

(58) Field of Classification Search .......... 60/641.1, 60/641.2, 641.3, 641.4, 641.5, 641.6, 641.7
See application file for complete search history.

(56) References Cited

U.S. PATENT DOCUMENTS

| | | | | |
|---|---|---|---|---|
| 1,425,174 A | * | 8/1922 | Cartter et al. | 126/639 |
| 3,097,589 A | * | 7/1963 | Moore | 99/408 |
| 3,991,817 A | * | 11/1976 | Clay | 165/45 |
| 4,091,623 A | * | 5/1978 | Edmondson et al. | 60/641.2 |
| 4,157,014 A | * | 6/1979 | Clark, Jr. | 60/655 |
| 4,166,363 A | * | 9/1979 | Mougin | 60/641.6 |
| 4,187,686 A | * | 2/1980 | Pommier | 60/647 |
| 4,391,229 A | * | 7/1983 | Turner | 123/25 B |
| 5,311,741 A | * | 5/1994 | Blaize | 60/676 |
| 5,488,828 A | * | 2/1996 | Brossard | 60/675 |

* cited by examiner

Primary Examiner—Hoang Nguyen
(74) Attorney, Agent, or Firm—Rabin & Berdo, P.C.

(57) ABSTRACT

A natural thermo-carrier heat release system that provides open or closed temperature regulation on an object with temperature delta to receive the heat release based on the work principle of descending of a flow at lower temperature and ascending at higher temperature of a fluid.

11 Claims, 36 Drawing Sheets

US 7,062,911 B2

NATURAL THERMO-CARRIER HEAT RELEASE SYSTEM

BACKGROUND OF THE INVENTION (a) Field of the Invention

The present invention is related to a natural thermo-carrier heat release system, and more particularly, to one that provides open or closed temperature regulation on an object with temperature delta to receive the heat release based on the work principle of descending of a flow at lower temperature and ascending at higher temperature of a fluid.

(b) Description of the Prior Art

A thermo-pump is usually used for the heat exchanging in either heating up or releasing heat for a fluid flowing through various types of space, and a fluid pump is also provided for auxiliary pumping. Therefore, a power source must be provided resulting in comparatively higher cost of installation, and the operation cost is also comparatively higher since the subsequent operation of the system also consumes energy source.

SUMMARY OF THE INVENTION

The primary purpose of the present invention is to provide a system including an approximately heat actuated convection device comprised of an active heat actuator and fluid transmission pipelines to be provided in a solid or fluid thermo-carrier, such as stratum, geodetic surface, pond, lake, river, desert, iceberg, or ocean where provides comparatively larger and reliable heat reservation capacity for the device to accept and heat up the fluid at comparatively lower temperature into the active heat actuator, and then for the heated fluid to flow to the object with temperature delta to receive the heat release by the natural convection of heat that features descending at lower temperature and ascending at higher temperature.

DETAILED DESCRIPTION OF THE PREFERRED EMBODIMENTS

The present invention is related to a natural thermo-carrier heat release system. Wherein, an active heat actuator is provided in a solid or liquid thermo-carrier, which may be of stratum, geodetic surface, pond, lake, river, desert, iceberg, or ocean where is given comparatively reliable capacity of heat reservation; both ends of the active heat actuator being respectively provided with a fluid transmission pipeline connecting respectively through an object with temperature delta and another object with temperature delta to receive the heat released to constitute an approximate heat actuated convection device; the heat actuated convection device is used to heat up the fluid of comparatively lower temperature flowing from an inlet transmission pipeline into the active heat actuator 108; a natural convection function is produced by the action of descending at lower temperature and ascending at higher temperature of the fluid for the fluid to be transported from an outlet transmission pipeline to the object with temperature delta to receive the heat released so to complete an open heat release system; or the fluid flows through the transmission pipeline to an active heat releaser 201 and flows back through the transmission pipeline to the active heat actuator 108 to conclude a closed heat release system.

Figure 1:
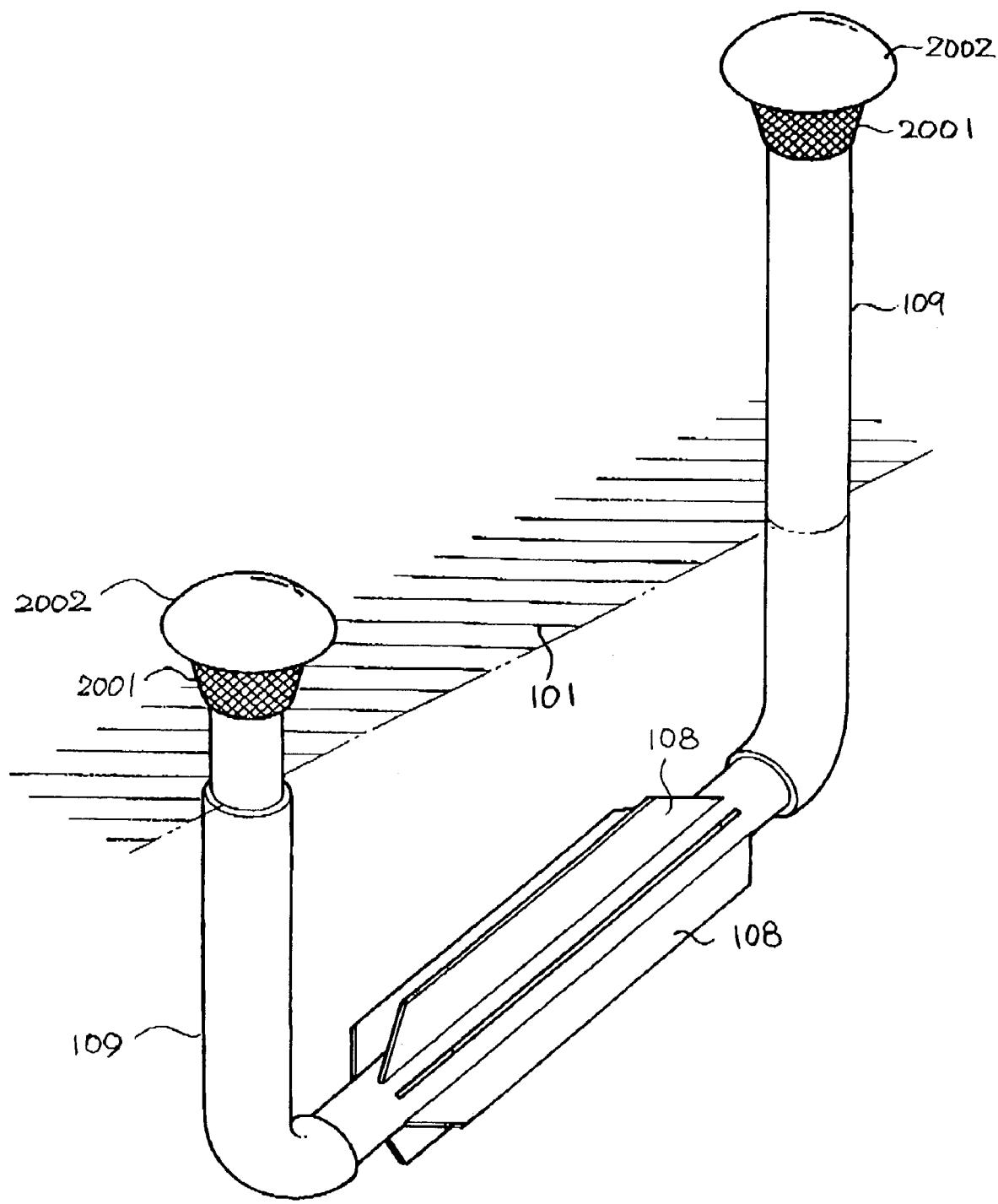
FIG. 1 is a perspective view of a natural thermo-carrier heat release system of the present invention that indicates an open heat release system.
Figure 2:
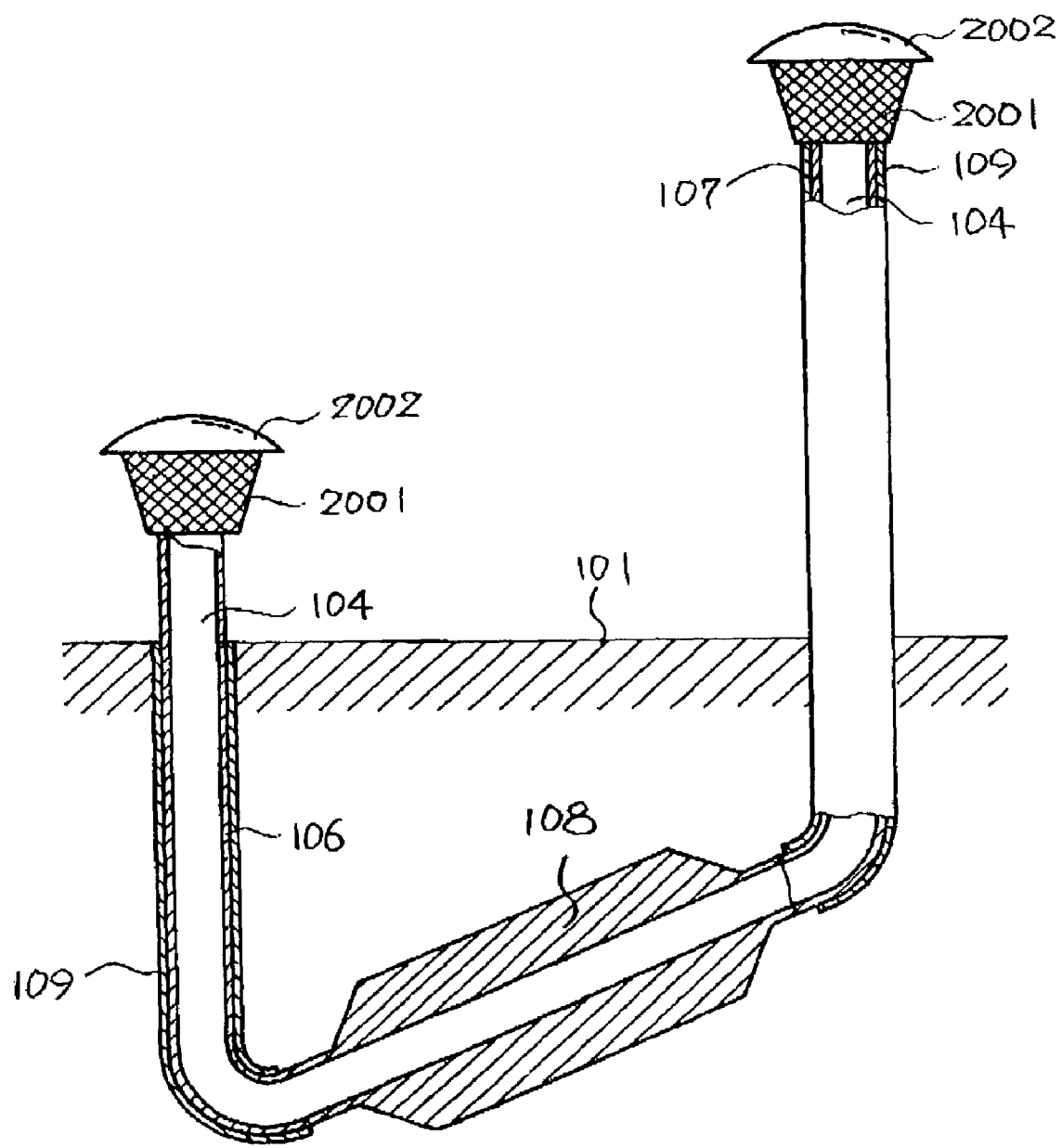
FIG. 2 is a sectional view taken from FIG. 1.

In conjunction with the preferred embodiments illustrated in the accompanying drawings, structural features, functions, and purpose of the present invention are given detailed description as follows:

FIG. 1 is a perspective view of a natural thermo-carrier heat release system of the present invention that indicates an open heat release system; and FIG. 2 is a sectional view taken from FIG. 1. As illustrated in FIGS. 1 and 2, an inlet 111 of the transmission pipeline is provided at a lower location in the heat actuated convection device 100 to facilitate the heat exchange fluid 104 at lower temperature to flow downward into the inlet 111 of the transmission pipeline; on the other hand, an outlet 112 of the transmission pipeline is provided at a higher location to facilitate the heat exchange fluid 104 having been heated by the active heat actuator 108 to be discharged upward from the outlet 112 of the transmission pipeline to constitute an open heat release system with its structural characteristics including:

a natural thermo-carrier 101: relates to a solid or liquid thermo-carrier in the form of stratum, geodetic surface, pond, lake, river, desert, iceberg, or ocean where is given comparatively reliable capacity of heat reservation;

an object 102 with temperature delta: relates to a gaseous, solid or liquid object at comparatively lower temperature and is capable of executing mutual heat conduction to reach equal temperature in its normal status by contacting a heat exchange fluid 104;

another object 103 with temperature delta to receive the heat released: relates to a space or a structure with specific function comprised by a gaseous, solid, or liquid object, which is the gaseous, solid or liquid object used during the operation of the system to directly or indirectly receive the heat released by the heat exchange fluid having been heated by the active heat actuator that includes of roof, road surface, greenhouse, pond, or a structure to be heated or prevented from being frozen;

the heat exchange fluid 104: comprised of a gaseous or liquid object containing good heat reservation and heat conduction, that executes in its normal status mutually the heat conduction to achieve equal temperature by contacting the object 102 with temperature delta;

the heat actuated convection device 100: comprised of at least one fluid transmission pipeline 106 for the exchange fluid at comparatively lower temperature to flow downward into and is connected to the bottom of at least one active heat actuator 108 provided in the natural thermo-carrier; and at least one fluid transmission pipeline 107 of upward export provided for the heat exchange fluid 104 after having been heated;

the fluid transmission pipelines 106, 107: each related to a pipe structure or building structure made in circular or any other geometric form, or to a passage inside the natural thermo-carrier; a good refractory structure 109 shall be provided between the downward import fluid transmission pipeline 106 and the natural thermo-carrier 101 it contacts, or the transmission pipeline shall be forthwith made of good refractory material; wherein, at least one downward import fluid transmission pipeline 106 is provided for the heat exchange fluid 104 at comparatively lower temperature to flow downward into the inlet 111 of the downward import fluid transmission pipeline 106 before entering into where lower in the active heat actuator 108 of the heat actuated convection device 100; and at least one upward export fluid transmission pipeline 107 is connected to the object 103 with temperature delta to receive the heat released from the upper end of the active actuator 108 of the heat actuated convection device 100 so to permit the heat exchange fluid 104 to be discharged through the outlet 112 of the upward export transmission pipeline to the object 103 with temperature delta to receive the heat released; and the active heat actuator 108: to be provided where lower in the heat actuated convection device 100, and may be extended in the same dimension from the transmission pipeline, or made in a structure in the dimension different from that either of the downward import transmission pipeline 106 or the upward export transmission pipeline 107 in a material with good heat conduction that is same as or different from that either of the downward import transmission pipeline 106 or the upward export transmission pipeline 107, and in a structural type that is sufficient to maintain good heat conduction status with the natural thermo-carrier 101, or the active heat actuation function is directly comprised of a space allowing the flow of the fluid inside the natural thermo-carrier 101 to replace the active heat actuator 108 made of a material with good heat conduction feature; and the casing of the active heat actuator may be further provided with heat conduction fins as appropriately.

Figure 3:
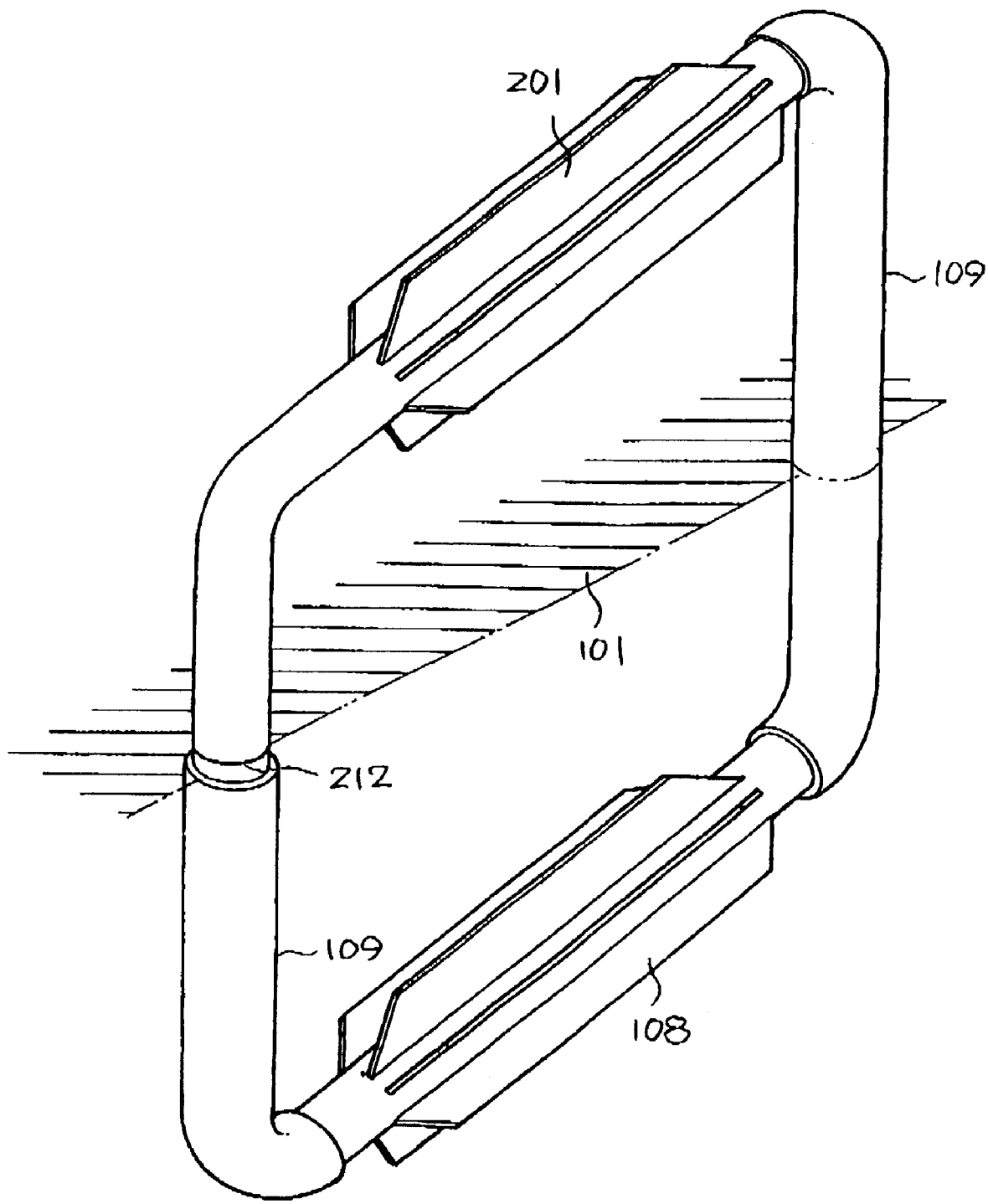
FIG. 3 is a perspective view showing that the natural thermo-carrier heat release system as illustrated in FIG. 1 further indicates a closed heat release system.
Figure 4:
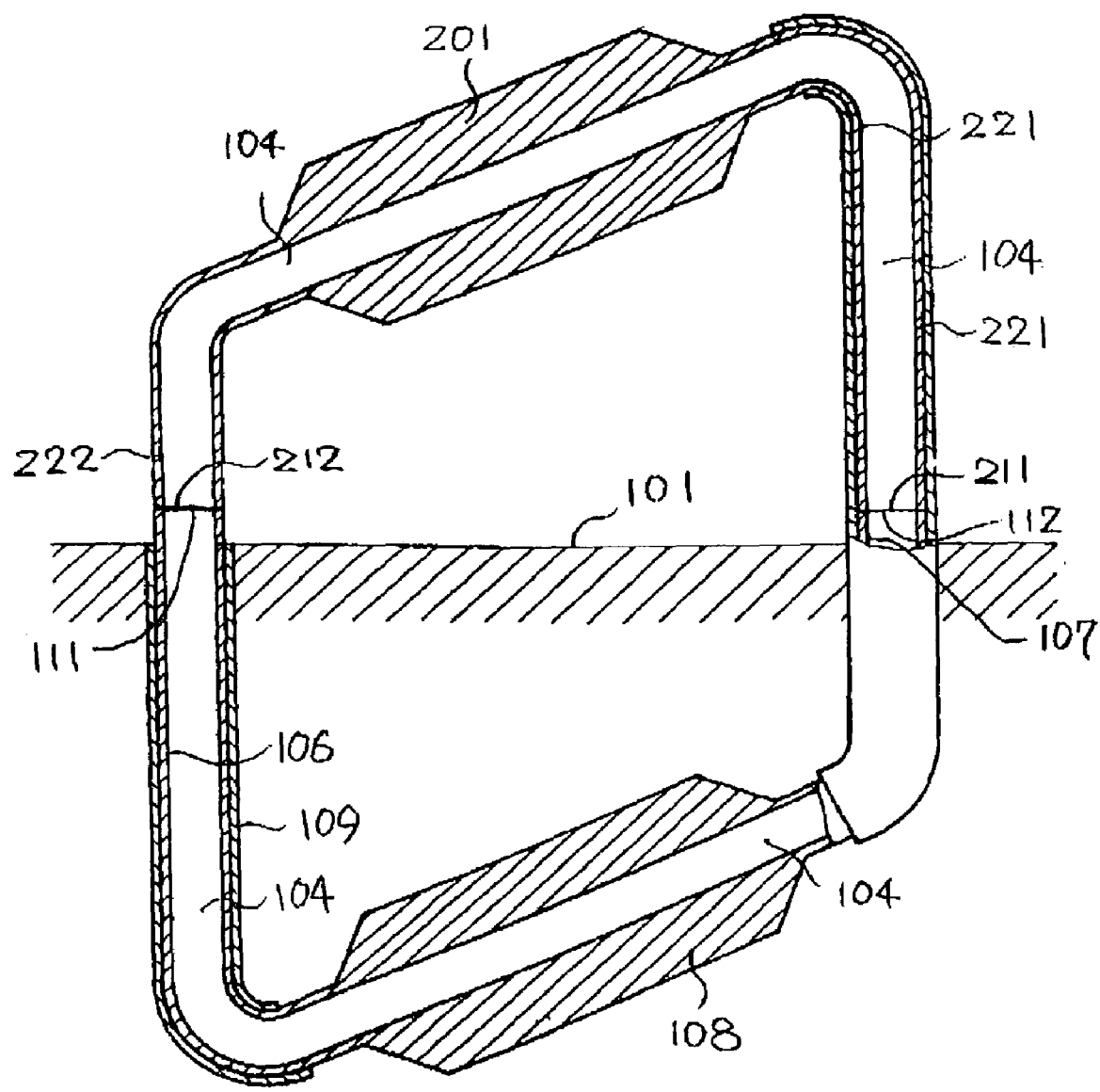
FIG. 4 is a sectional view taken from FIG. 3.
Figure 5:
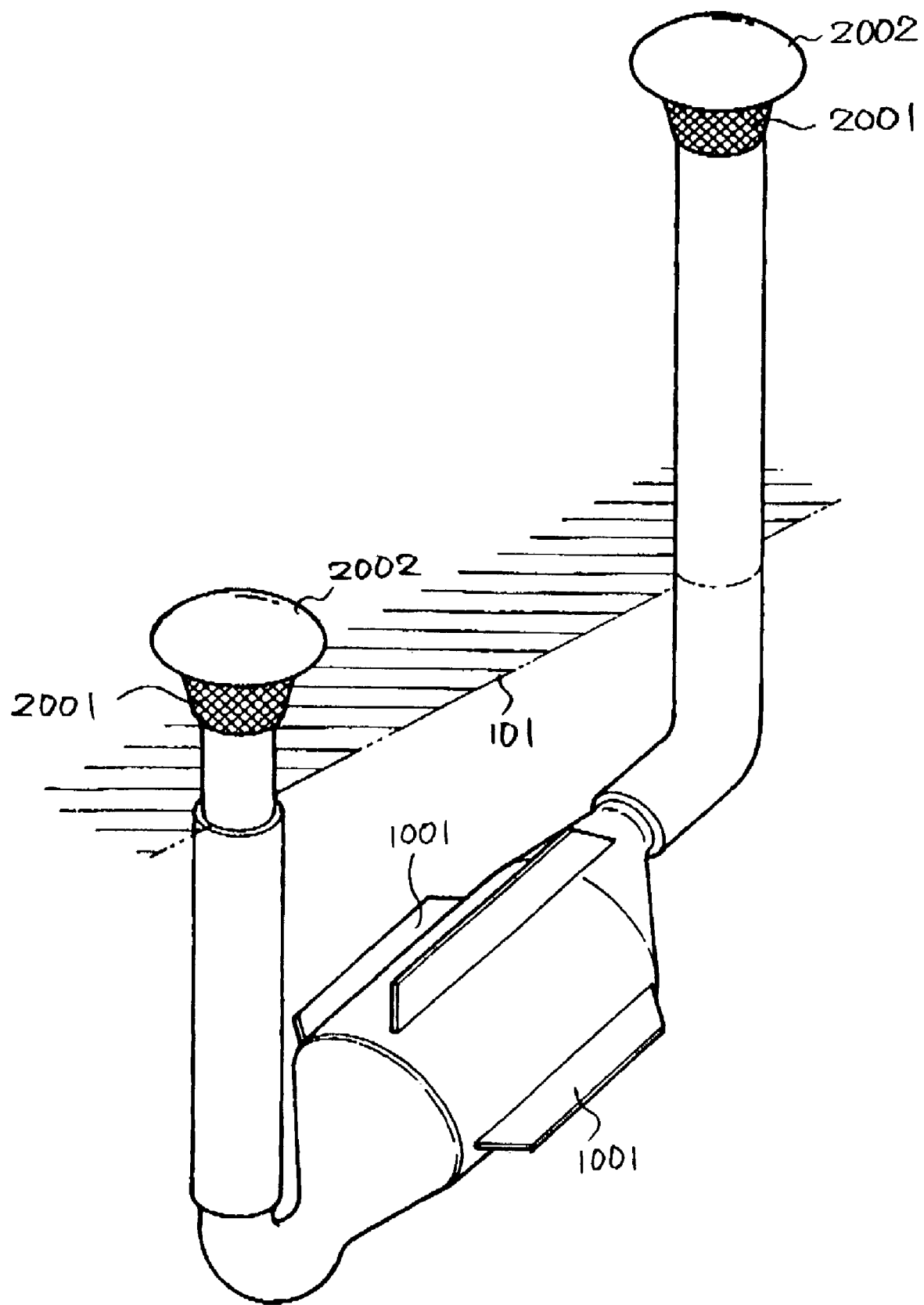
FIG. 5 is a perspective view showing an open heat release system of the present invention showing that heat conduction fins or plate barriers to prevent inverse flow are further provided inside the active heat actuator.
Figure 6:
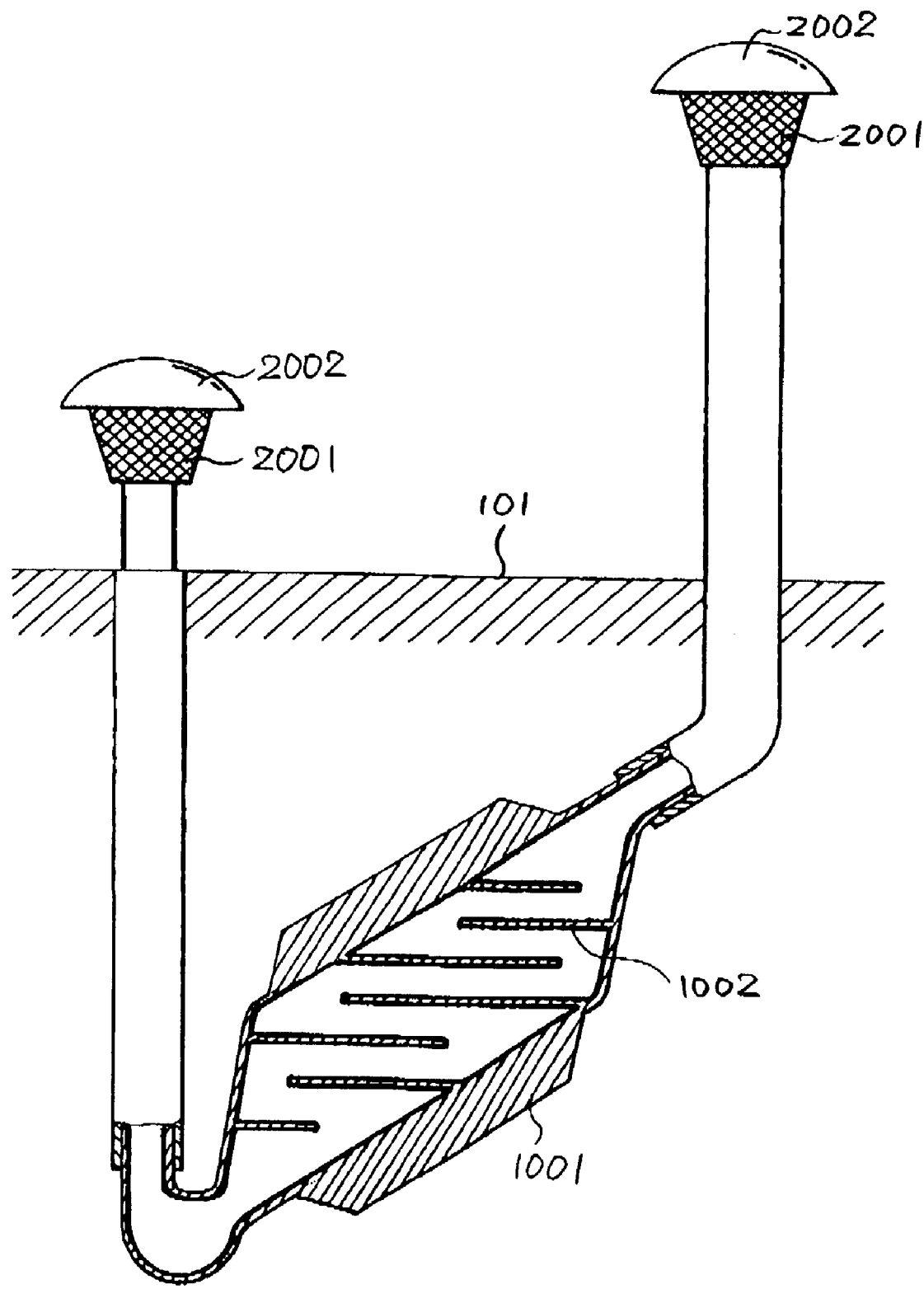
FIG. 6 is a sectional view taking from FIG. 5.

FIG. 3 is a perspective view showing that the natural thermo-carrier heat release system as illustrated in FIG. 1 further indicates a closed heat release system; and FIG. 4 is a sectional view taken from FIG. 3. As illustrated in FIGS. 3 and 4, an active heat releaser 201, a transmission pipeline 221, and another transmission pipeline 222 are provided at the top between the outlet 112 of the fluid transmission pipeline 107 adapted to the active heat actuator 108 in the heat actuated convection device 100 and the inlet 111 of the fluid transmission pipeline 106 to constitute a structure indicating closed flow passage, including a connection provided at a higher location of the active heat releaser 201 between the outlet 112 of the transmission pipeline 107 and the transmission pipeline 221 for the ascending fluid so to guide the heat exchange fluid 104 having been heated by the active heat actuator 108 into the active heat releaser 201, thus to release the heat to the object 103 with temperature delta to receive the heat released in the peripheral of the active heat releaser 201; and the fluid transmission pipeline 222 adapted to the lower location of the active heat releaser 201 connecting to the inlet 111 of the transmission pipeline of the active is provided to guide the heat exchange fluid 104 having its temperature reduced by the active heat releaser 201 into the active heat actuator 108 to constitute a closed circulation system of heat actuation and heat release; additional to the object 103 with temperature delta to receive the heat released from the natural thermo-carrier 101, the heat exchange fluid 104, the heat actuated convection device 100, the transmission pipelines 106, 107 to transmit the heat exchange fluid 104 at comparatively lower temperature to enter into the bottom of the active heat actuator 108 through the inlet 111 of the transmission pipeline 106 while the heat exchange fluid 104 having been heated by the active heat actuator 108 is discharged from the outlet 112 of the upward export transmission pipeline 107 provided at the upper end of the active heat actuator 108 as illustrated in FIGS. 1 and 2, the closed heat actuation and release circulation system illustrated in FIGS. 3 and 4 is further comprised of:

transmission pipelines 221, 222: the transmission pipeline 221 is comprised of one or more than one set of refractory structure 109, or pipe structure or building structure made of material with good refractory property in circular or any other geometric form, having its lower end connected through the outlet 112 of the upward export transmission pipeline of the transmission pipeline 107 and its upper end connecting to the inlet 211 provided at the upper end of the active heat release 201 to transmit upward the heat exchange fluid 104 at comparatively higher temperature; and the transmission pipeline structure 222 comprised of one or more than one set of the refractory structure 109, or made of a material with good refractory property to transmit downward the heat exchange fluid 104 at lower temperature after having released the heat, the lower end of the transmission pipeline structure 222 is connected to the inlet 111 of the fluid transmission pipeline 106 and its upper end connected to the outlet 212 provided at the lower end of the active heat releaser 201 to constitute a "∩"-shape heat release convection device 200, and further to constitute a closed heat actuation and release circulation system with the heat actuated convection device 100 containing the active heat actuator 108, and two transmission pipelines 106, 107;

the active heat releaser 201: comprised of one or more than one set of a good heat releasing material generally available in the market in an integrated or multiple pieces type of structure, and additional heat conduction fins 202 may be provided as appropriately; or the active heat releaser 201 is related to an active heat releaser with active heat releasing function comprised of a transmission pipeline provided with the function of heat releasing; and the object 103 with temperature delta to receive the heat released: related to a space or a structure with specific function comprised by a gaseous, solid, or liquid object, which is the gaseous, solid or liquid object used during the operation of the system to directly or indirectly receive the heat released by the heat exchange fluid having been heated by the active heat actuator that includes of roof, road surface, greenhouse, pond, or a structure to be heated or prevented from being frozen;

FIG. 5 is a perspective view showing an open heat release system of the present invention showing that heat conduction fins or plate barriers to prevent inverse flow are further provided inside the active heat actuator; and FIG. 6 is a sectional view taking from FIG. 5. FIGS. 5 and 6 are essentially characterized by that in the open 3D structure of the natural thermo-carrier heat release system illustrated in FIGS. 1 and 2 is further provided as appropriately with heat conduction fins 1001 to improve the heat conduction effect with the natural thermo-carrier additional to the exterior of the active heat actuator 108 provided at the bottom of the heat actuated convection device 100; and multiple plate barriers 1002 arranged alternatively at an upper inclination to guide heat and prevent inverse flow are further provided inside the active heat actuator 108 to improve heat conduction effect and prevent the heat exchange fluid 104 having been heat from flowing back.

Figure 7:
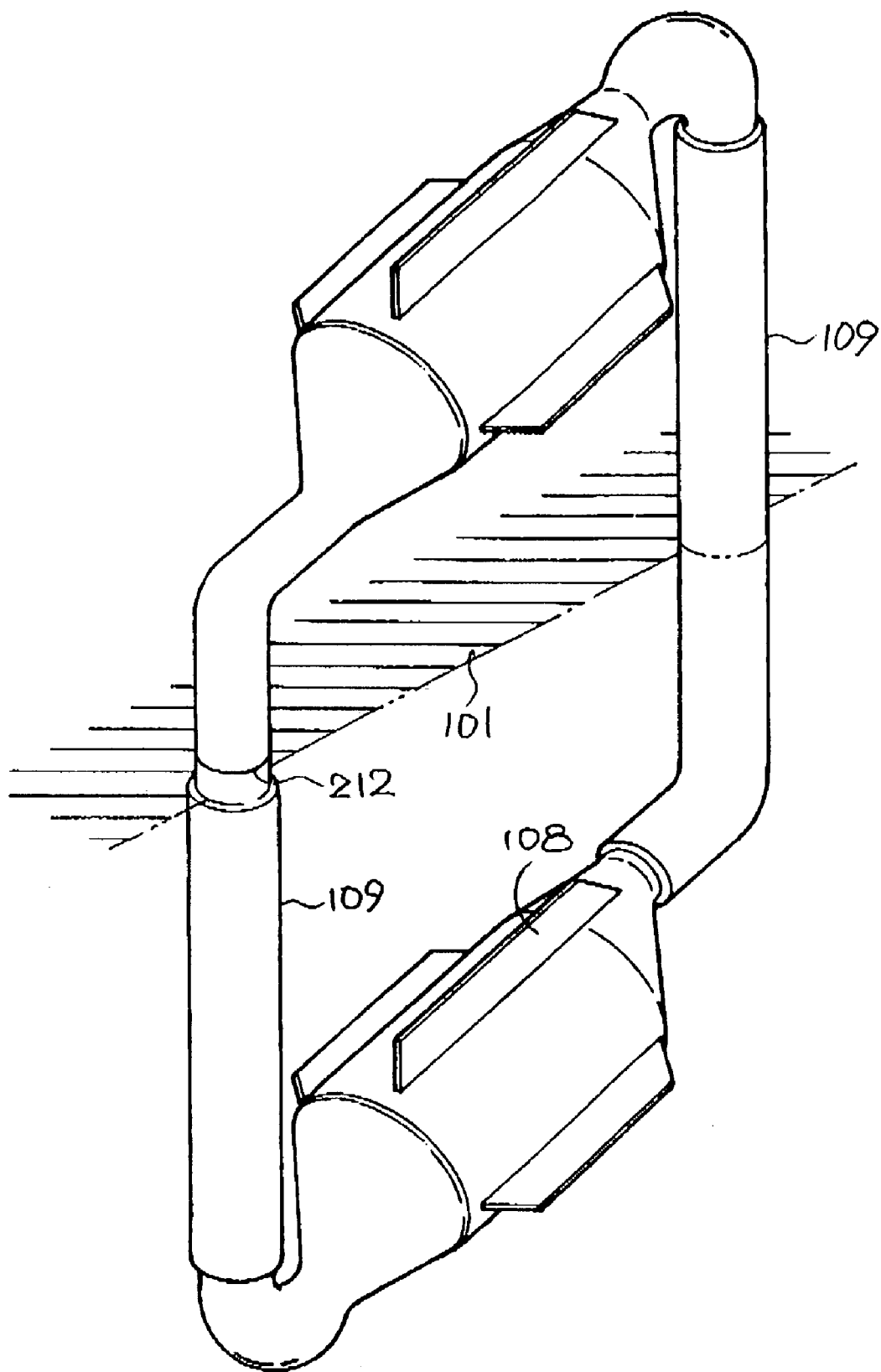
FIG. 7 is a perspective view showing a closed heat release system of the present invention showing that heat conduction fins or plate barriers to prevent inverse flow are further provided inside the active heat actuator.
Figure 8:
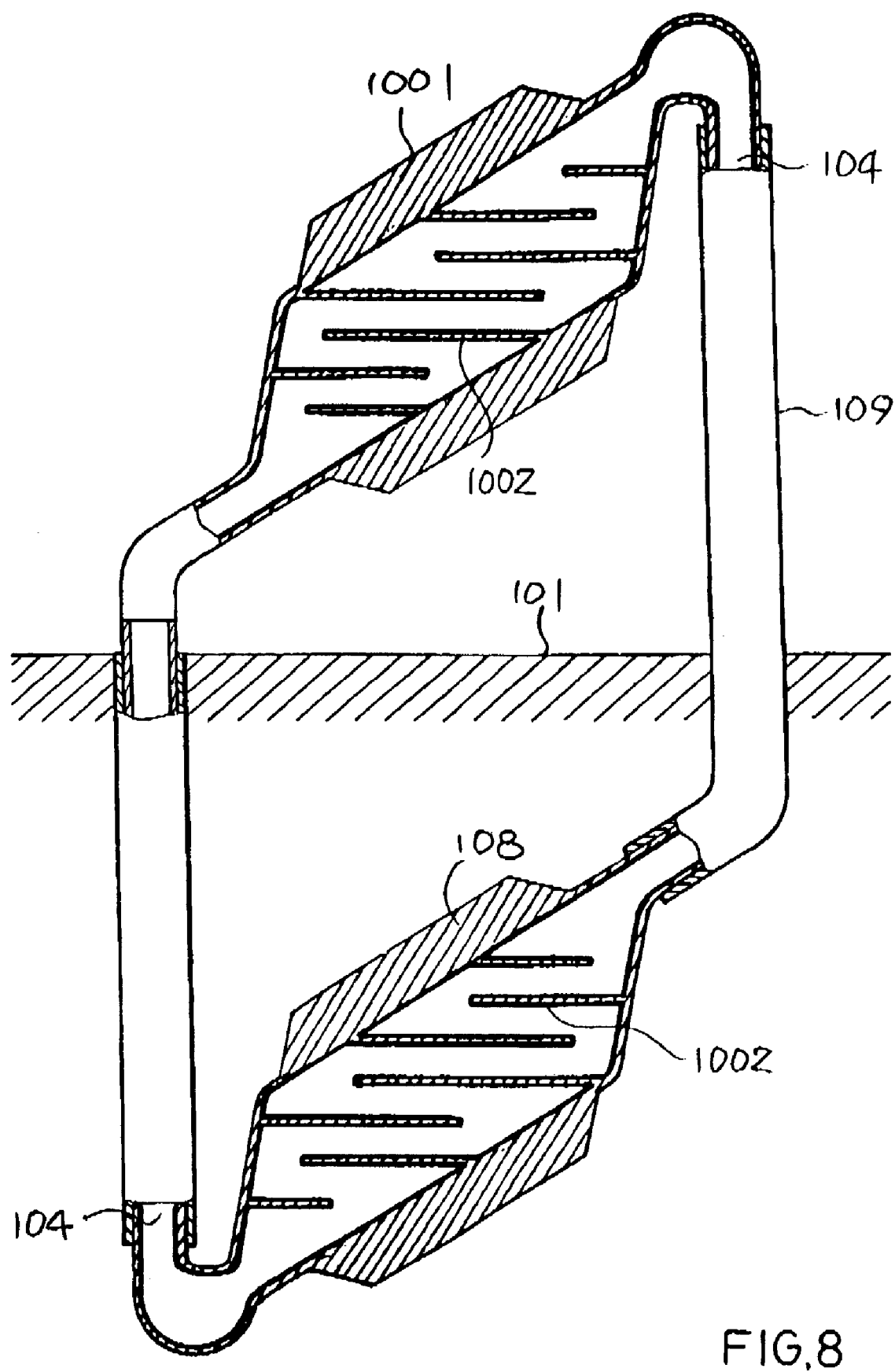
FIG. 8 is a sectional view taken from FIG. 7.

FIG. 7 is a perspective view showing a closed heat release system of the present invention showing that heat conduction fins to prevent inverse flow are further provided inside the active heat actuator; and FIG. 8 is a sectional view taken from FIG. 7. FIGS. 7 and 8 are essentially characterized by that in the open 3D structure of the closed flow passage of the natural thermo-carrier heat release system illustrated in FIGS. 3 and 4 is further provided as appropriately with heat conduction fins 1001 to improve the heat conduction effect with the natural thermo-carrier additional to the active heat actuator 108 provided at the bottom of the heat actuated convection device 100 and the active heat releaser 201 of the "∩"-shape heat release convection device 200 provided relatively at higher location; and multiple plate barriers arranged alternatively at an upper inclination to guide heat and prevent inverse flow are further provided inside the active heat actuator 108 and the active heat releaser 201 to improve heat conduction effect and prevent the heat exchange fluid 104 having been heat from flowing back.

The heat release system working on heat convection actuated by the natural thermo-carrier may have as appropriately its active heat actuator 108 and the active heat releaser 201 comprised of the structural type of fluid transmission pipe in the form of straight pipe, curved pipe, spiral pipe, waived pipe or any other 2D or 3D curved pipe at an upper inclination; multiple heat conduction fins 1001 may be further provided externally to both of the active heat actuator 108 and the active heat releaser 201 as required, and additional plate barriers may be provided inside both of the active heat actuator 108 and the active heat releaser 201 as appropriately.

Figure 9:
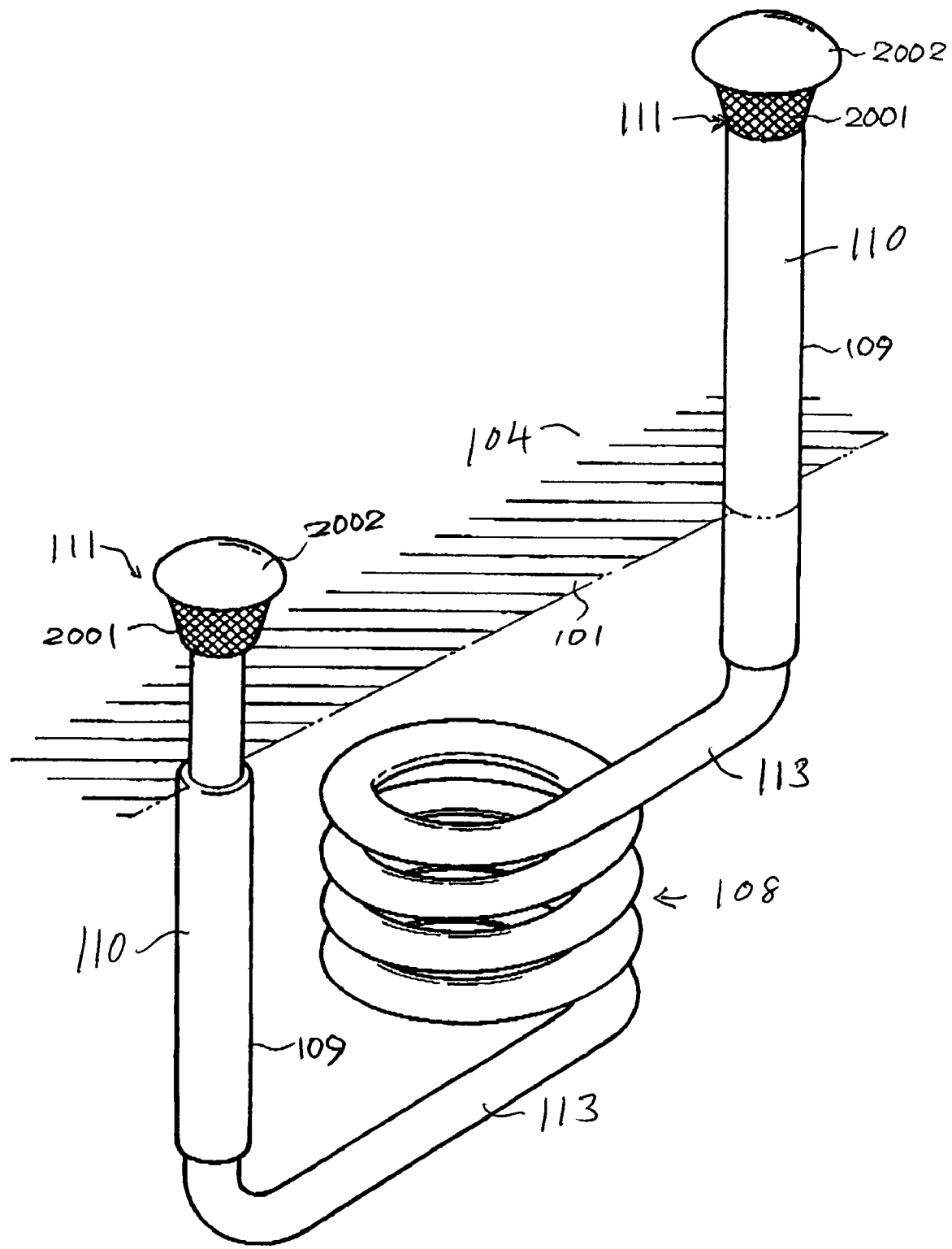
FIG. 9 is a perspective view showing a structure of an open heat release system of the present invention with the active heat actuator made in the form of a spiral pipe.
Figure 10:
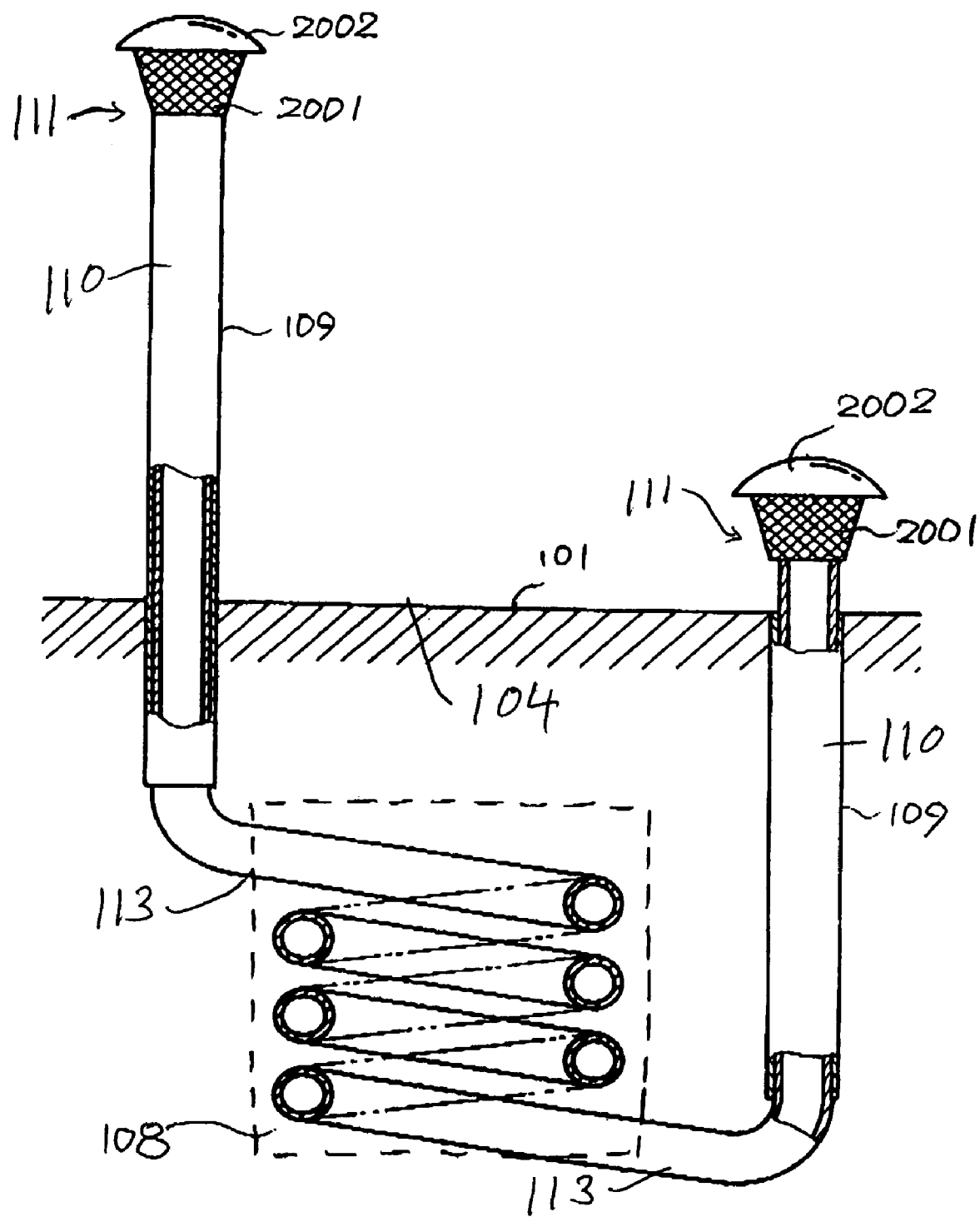
FIG. 10 is a sectional view taken from FIG. 9.

FIG. 9 is a perspective view showing a structure of an open heat release system of the present invention with the active heat actuator made in the form of a spiral pipe; and FIG. 10 is a sectional view taken from FIG. 9. As illustrated in FIGS. 9 and 10, the active heat actuator 108 may be comprised of one or more than one set of pipe structure in circular or any other geometric form arranged in spiral to match the transmission pipeline to constitute an open heat release system; multiple heat conduction fins 1001 may be provided externally to the active heat actuator 108 as required, and multiple plate barriers to improve heat conduction and prevent inverse flow arranged alternatively at an upper inclination may be provided inside the active heat actuator 108 as appropriately.

FIG. 9 shows that the thermo-carrier heat release system for a fluid 104 is disposed adjacent to the solid or liquid heat sink thermo-carrier 101, which may be of stratum, geodetic surface, pond, lake, river, desert, iceberg, or ocean. The heat actuator 108 is disposed partially within the solid or liquid thermo-carrier 101 and partially within the fluid 104. The fluid transmission pipeline of the actuator 108 includes two open ends (or, inlets) 111 both immersed in the fluid 104 and connecting respectively through a portion of the pipeline within the thermo-carrier 101, such that the fluid can flow into one of the open ends 111 and out of the other of the open ends 111, which may include a filtration device 2001 and/or filtration hood structure 2002 as illustrated, meanwhile passing through the portion of the pipeline within the thermo-carrier 101. As shown in FIGS. 9–10, the pipeline includes two generally vertical riser portions 110 leading respectively between the two open ends 111 and an inclined portion 113, which comprises a portion of the pipeline within the thermo-carrier 101. The drawing shows that the two opens ends 111 are disposed in the fluid 104 at two different elevations. The drawing also shows that the portion of the pipeline within the thermo-carrier comprises the inclined portion 113 disposed between a lower end thereof communicating with a first one of the riser portions 110 leading to a lower one of the two open ends 111, and an upper end thereof communicating with a second one of the riser portions 110 leading to an upper one of the two open ends 111; that the two riser portions 110 are substantially equal in height; that the riser portions 110 may comprise refractory structures 109; and that the inclined portion 113 has a generally helical (or, spiral) shape.

Figure 11:
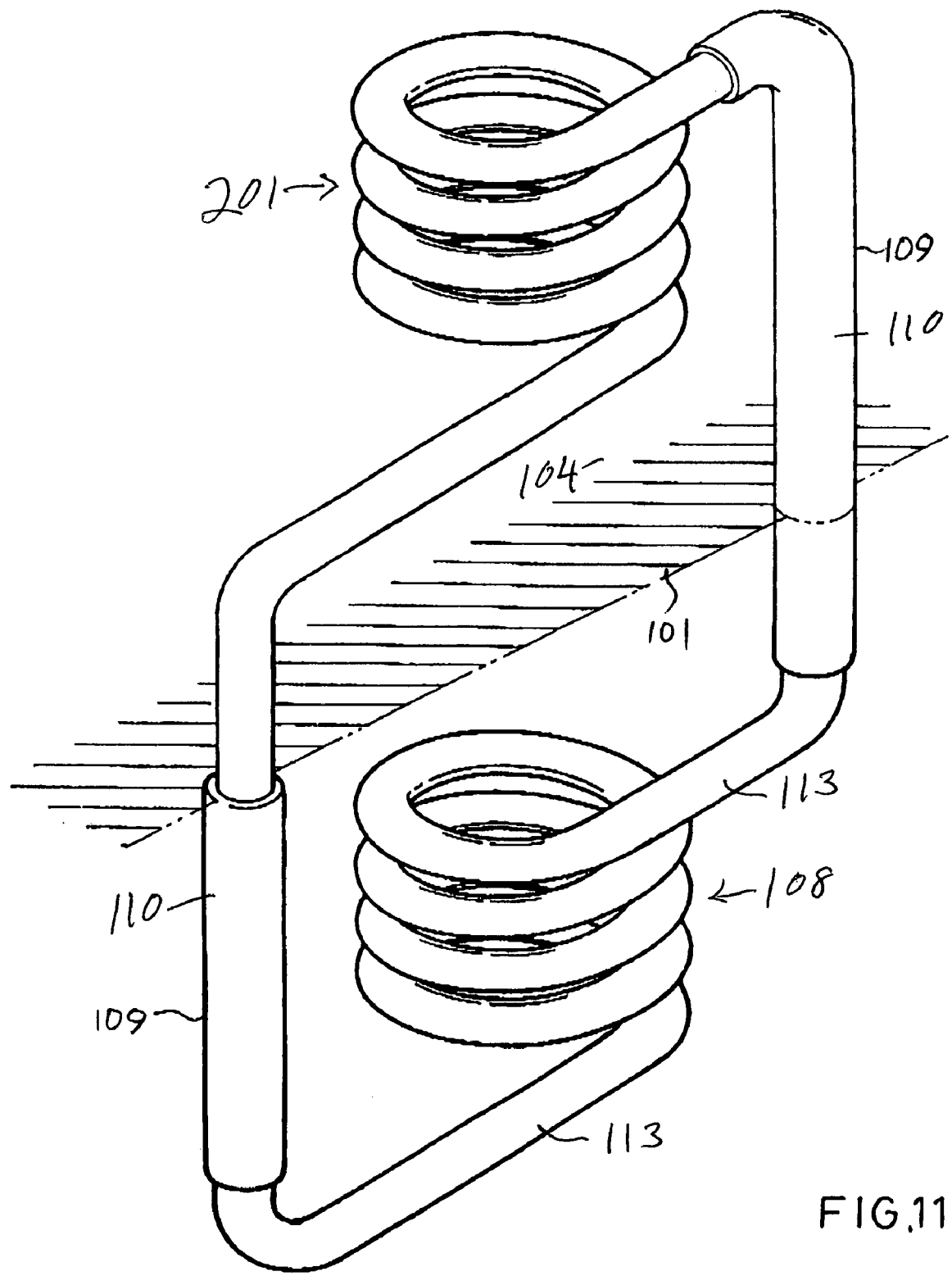
FIG. 11 is a perspective view showing a structure of a closed heat release system of the present invention with the active heat actuator or the active heat releaser made in the form of a spiral pipe.
Figure 12:
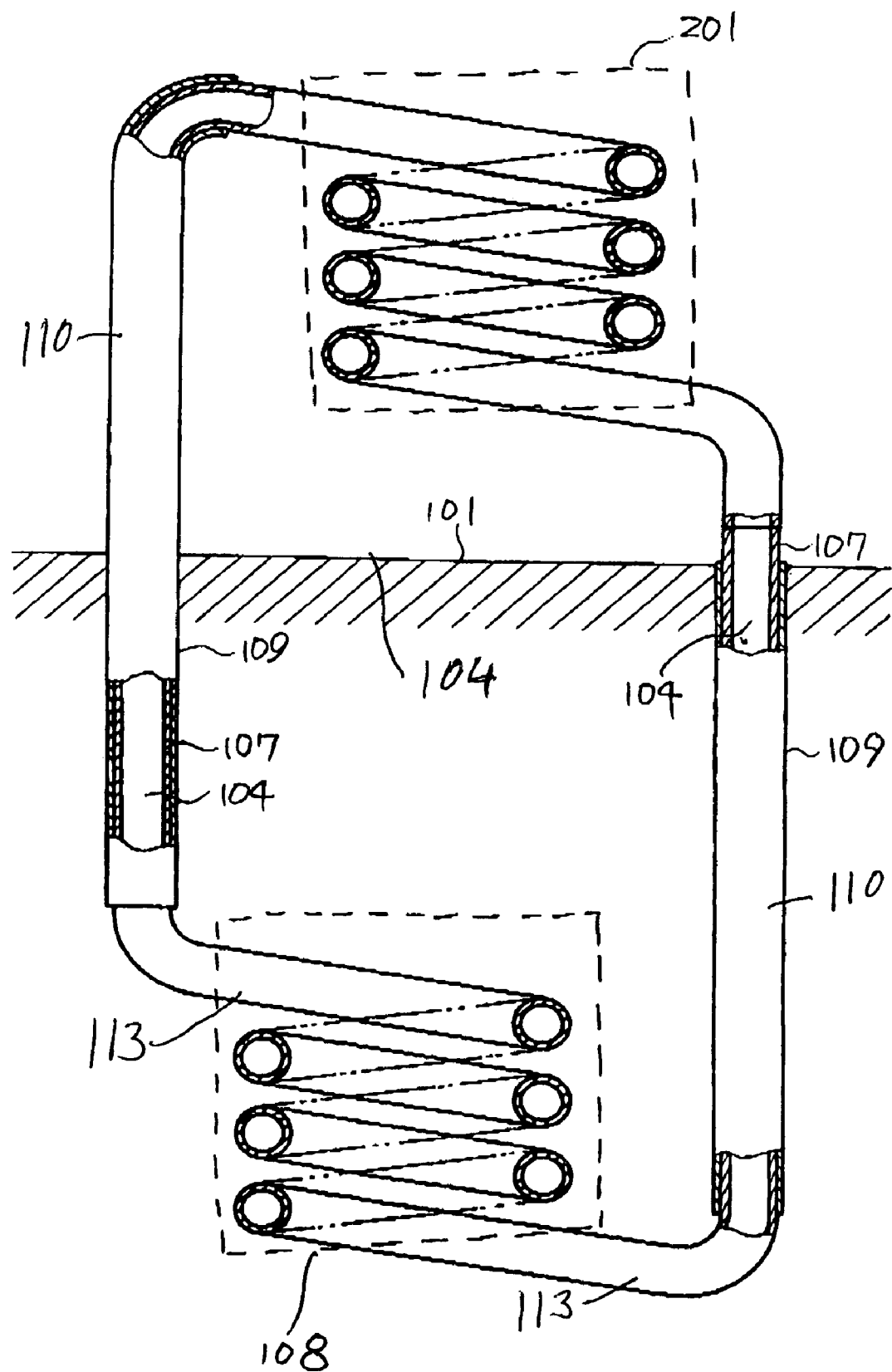
FIG. 12 is a sectional view taken from FIG. 11.

FIG. 11 is a perspective view showing a structure of a closed heat release system of the present invention with the active heat actuator or the active heat releaser made in the form of a spiral pipe; and FIG. 12 is a sectional view taken from FIG. 11. As illustrated in FIGS. 11 and 12, both of the active heat actuator 108 and the active heat releaser 201 may be comprised of one or more than one set of pipe structure in circular or any other geometric form arranged in spiral to match the transmission pipeline to constitute a closed heat release system; multiple heat conduction fins 1001 may be provided externally to the active heat actuator 108 and the active heat releaser 201 as required, and multiple plate barriers to improve heat conduction and prevent inverse flow arranged alternatively at an upper inclination may be provided inside the active heat actuator 108 and the active heat releaser 201 as appropriately.

Figure 13:
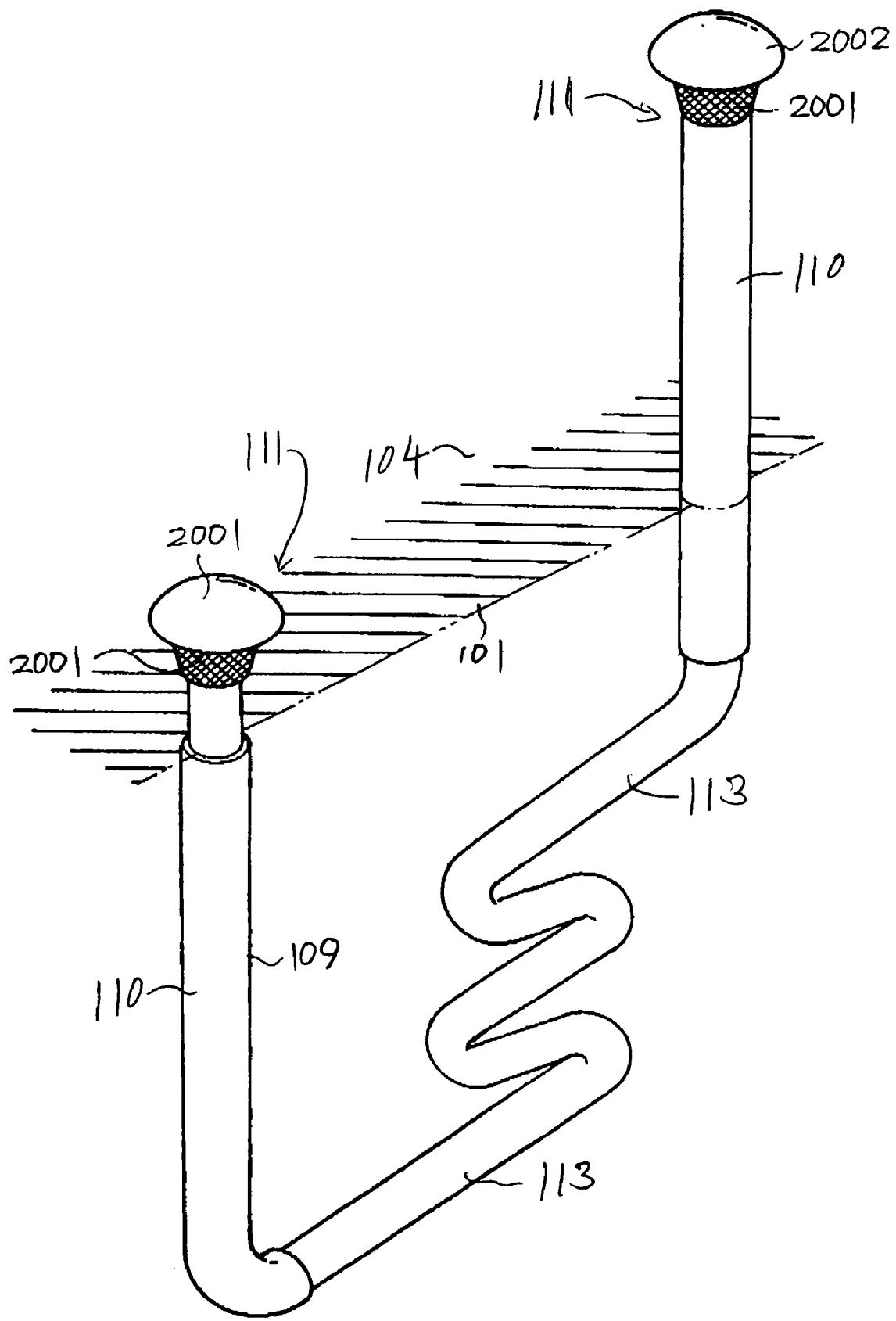
FIG. 13 is a perspective view showing a structure of an open heat release system of the present invention with the active heat actuator made in the form of a curved pipe.
Figure 14:
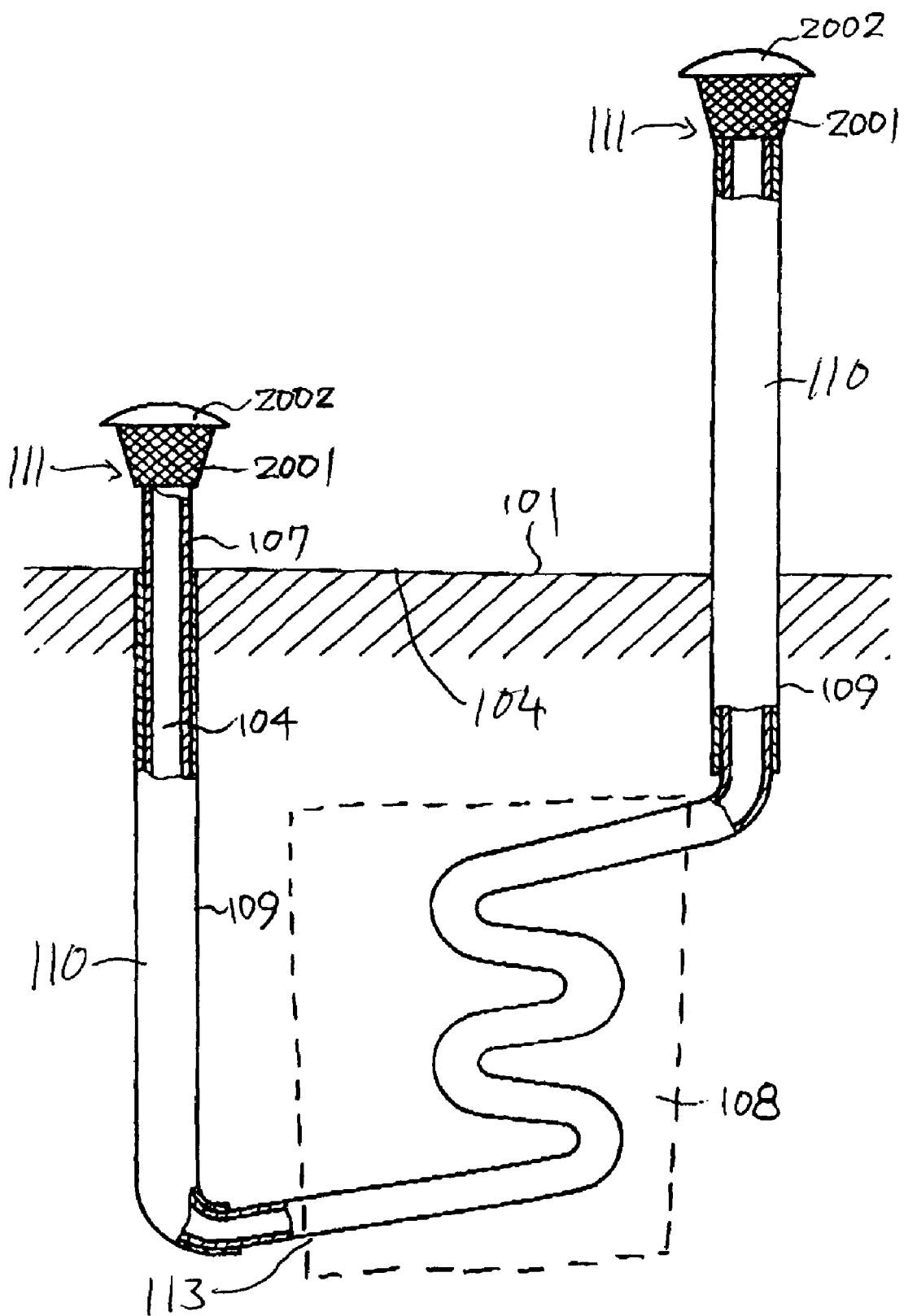
FIG. 14 is a sectional view taken from FIG. 13.

FIG. 13 is a perspective view showing a structure of an open heat release system of the present invention with the active heat actuator made in the form of a curved pipe; and FIG. 14 is a sectional view taken from FIG. 13. As illustrated in FIGS. 13 and 14, the active heat actuator 108 may be comprised of one or more than one set of pipe structure in circular or any other geometric form arranged in curve to match the transmission pipeline to constitute an open heat release system; multiple heat conduction fins 1001 may be provided externally to the active heat actuator 108 as required, and multiple plate barriers to improve heat conduction and prevent inverse flow arranged alternatively at an upper inclination may be provided inside the active heat actuator 108 as appropriately.

Figure 15:
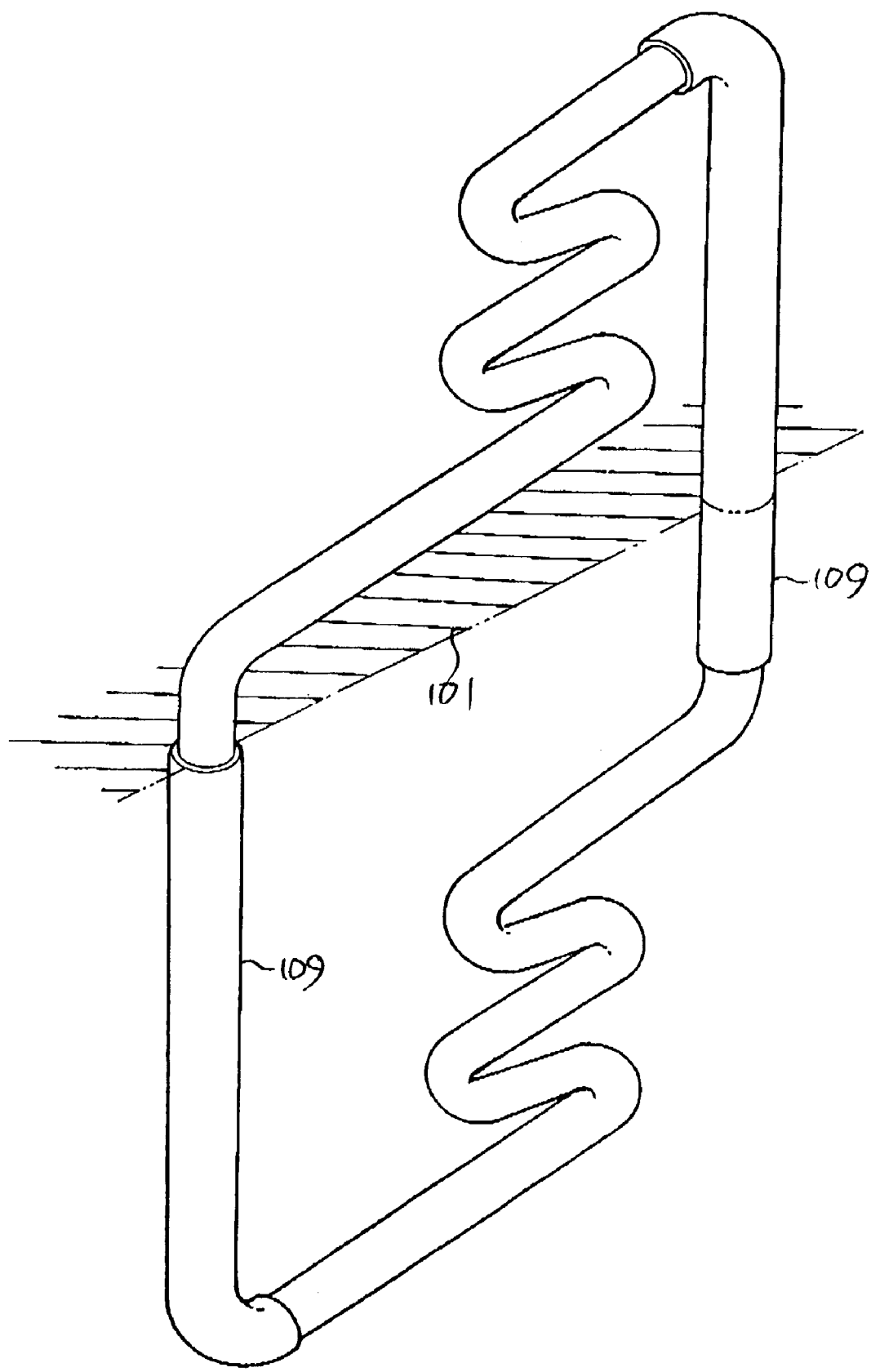
FIG. 15 is a perspective view showing a structure of a closed heat release system of the present invention with the active heat actuator or the active heat releaser made in the form of a curved pipe.
Figure 16:
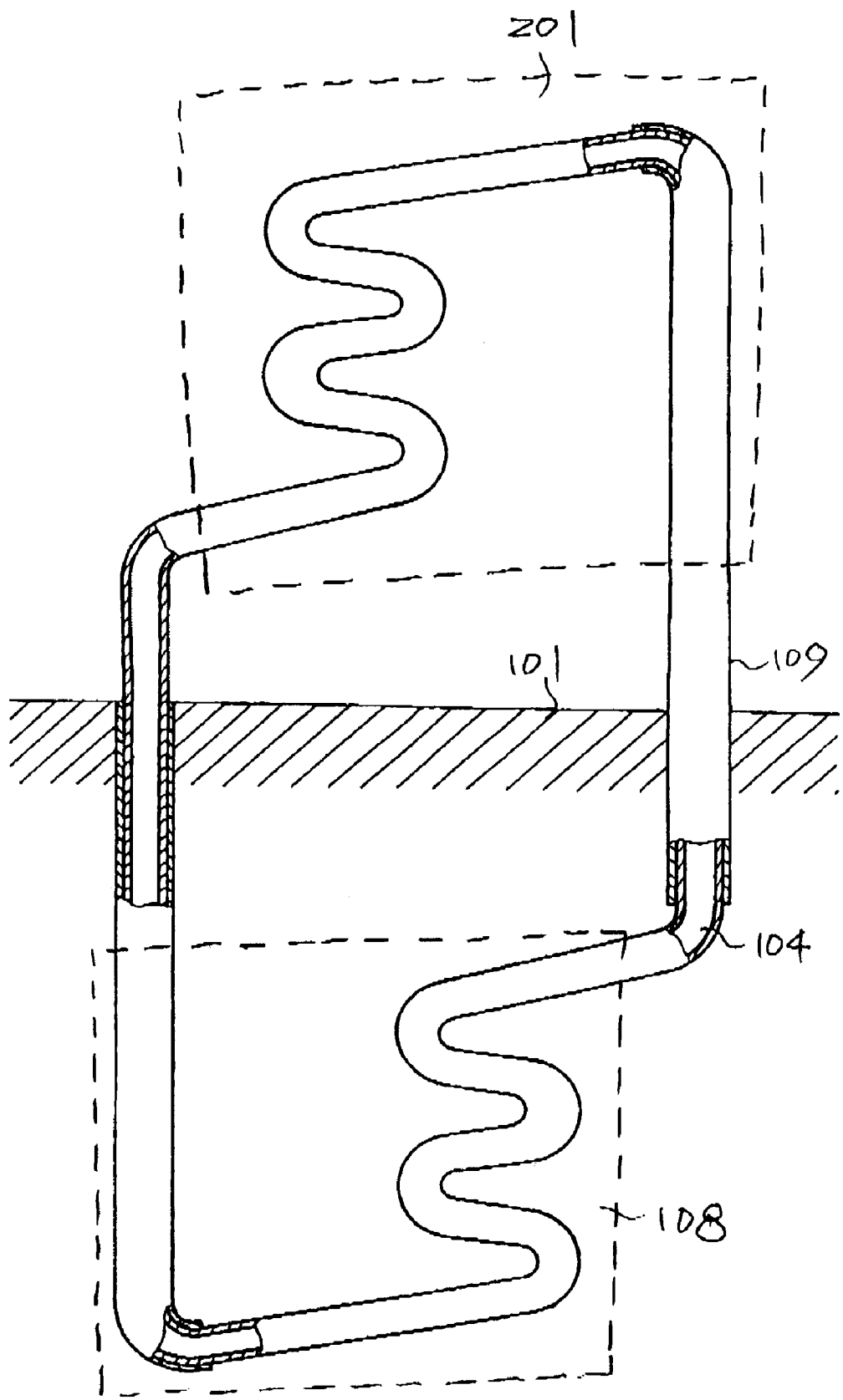
FIG. 16 is a sectional view taken from FIG. 15.

FIG. 15 is a perspective view showing a structure of a closed heat release system of the present invention with the active heat actuator or the active heat releaser made in the form of a curved pipe; and FIG. 16 is a sectional view taken from FIG. 15. As illustrated in FIGS. 15 and 16, both of the heat actuator 108 and the active heat releaser 201 may be comprised of one or more than one set of pipe structure in circular or any other geometric form arranged in curve to match the transmission pipeline to constitute a closed heat release system; multiple heat conduction fins 1001 may be provided externally to the active heat actuator 108 and the active heat releaser 201 as required, and multiple plate barriers to improve heat conduction and prevent inverse flow arranged alternatively at an upper inclination may be provided inside the active heat actuator 108 and the active heat releaser 201 as appropriately.

Figure 17:
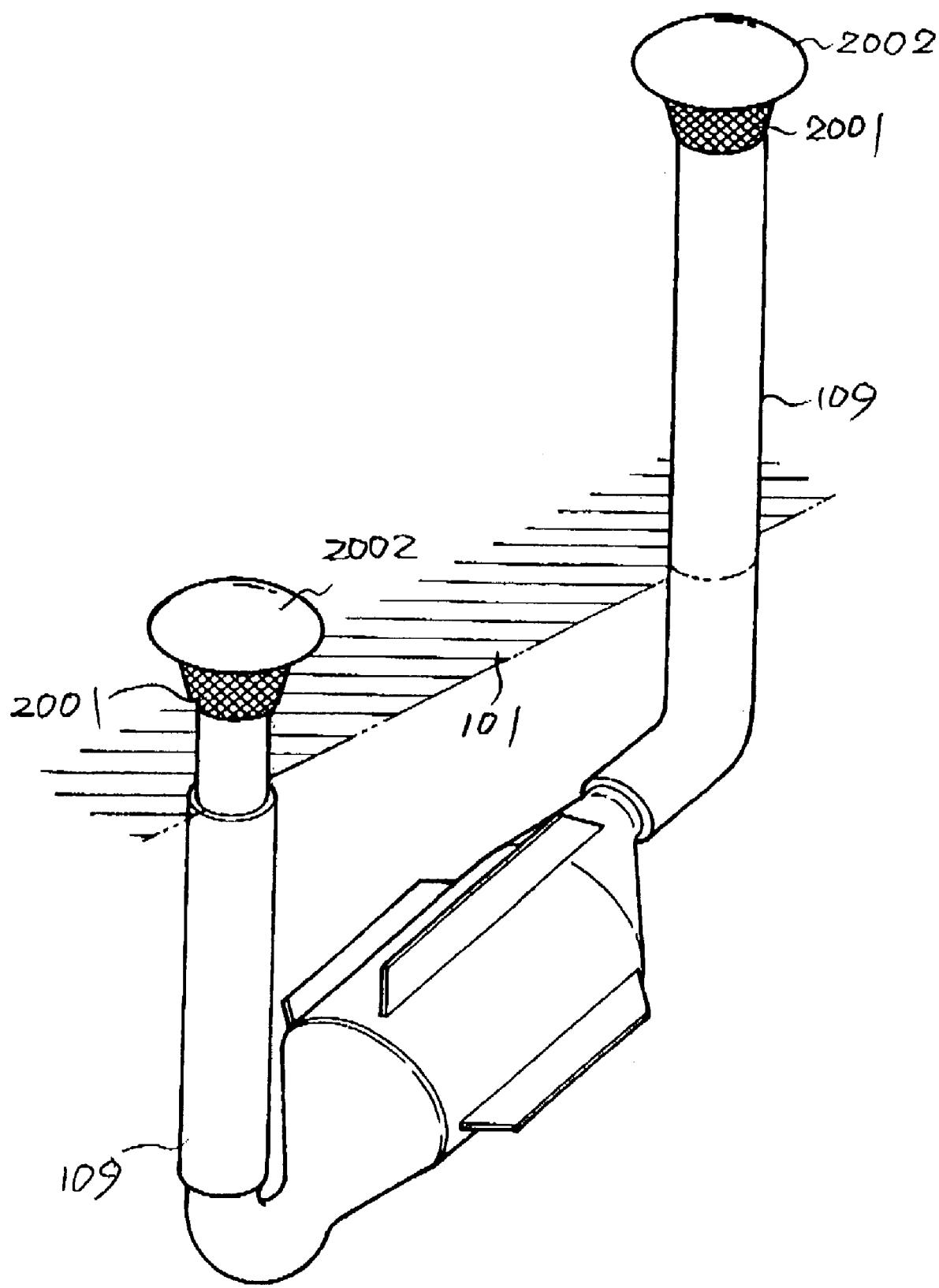
FIG. 17 is a perspective view of a structure of an open heat release system of the present invention with the active heat releaser made of a conduction pipe in comparatively larger section of flow conduction.
Figure 18:
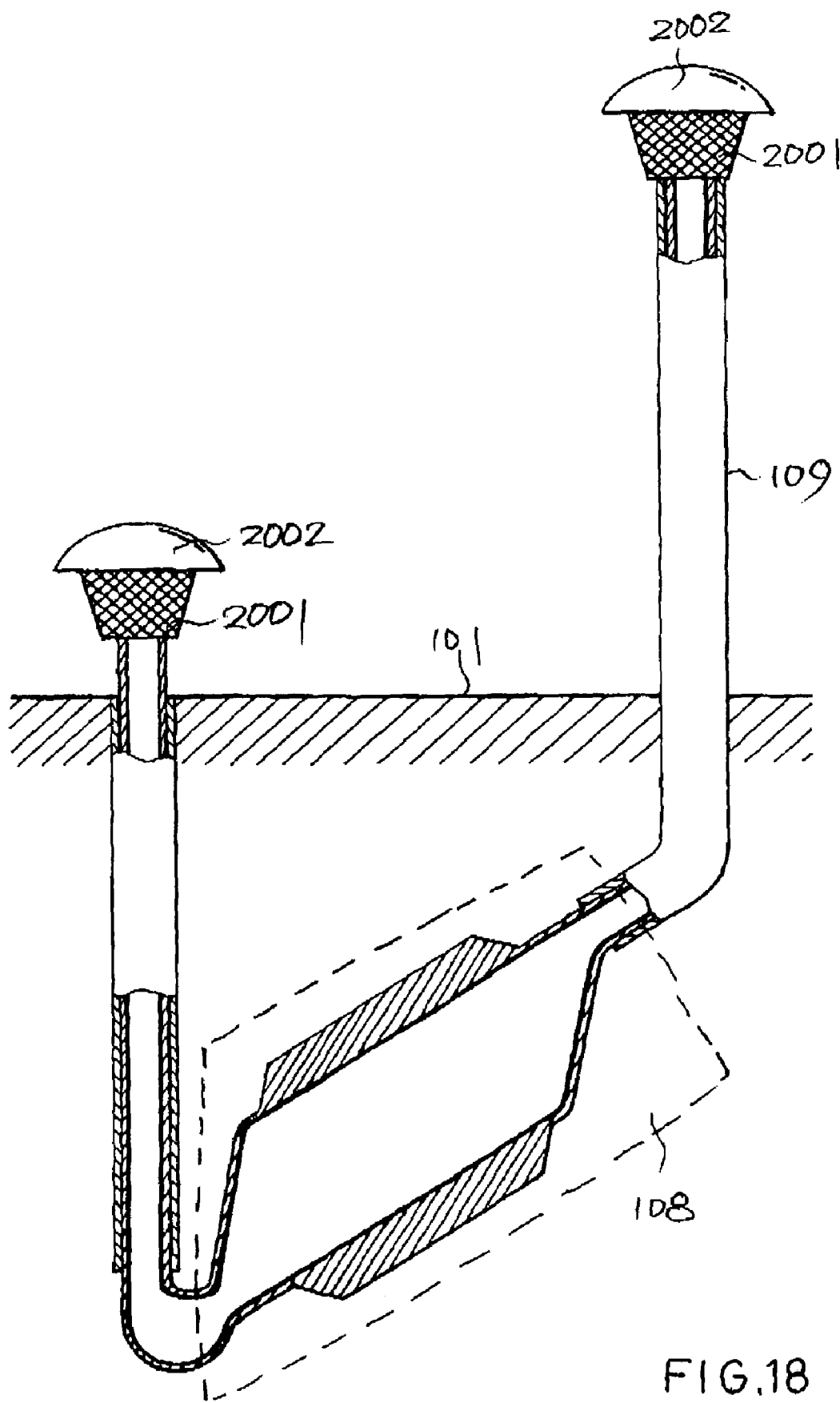
FIG. 18 is a sectional view taken from FIG. 17.

FIG. 17 is a perspective view of a structure of an open heat release system of the present invention with the active heat releaser made of a conduction pipe in comparatively larger section of flow conduction; and FIG. 18 is a sectional view taken from FIG. 17. As illustrated in FIGS. 17 and 18, the active heat actuator 108 may be comprised of one or more than one set of pipe structure in circular or any other geometric form in a comparatively larger fluid conduction section area to match the transmission pipeline to constitute an open heat release system; multiple heat conduction fins 1001 may be provided externally to the active heat actuator 108 as required, and multiple plate barriers to improve heat conduction and prevent inverse flow arranged alternatively at an upper inclination may be provided inside the active heat actuator 108 as appropriately.

Figure 19:
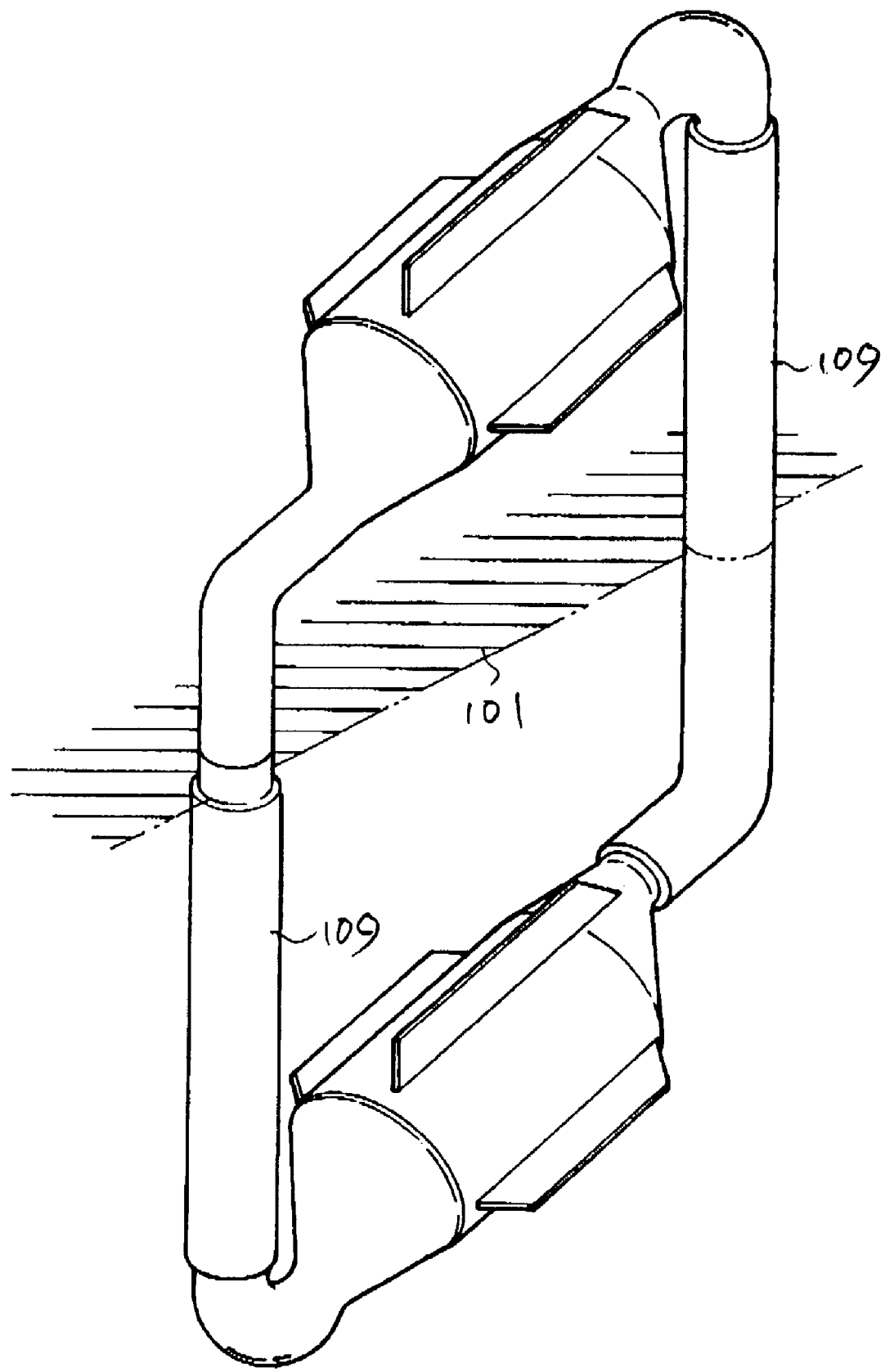
FIG. 19 is a perspective view of a structure of a closed heat release system of the present invention with the active heat actuator or the active heat releaser made of a conduction pipe in comparatively larger section of flow conduction.
Figure 20:
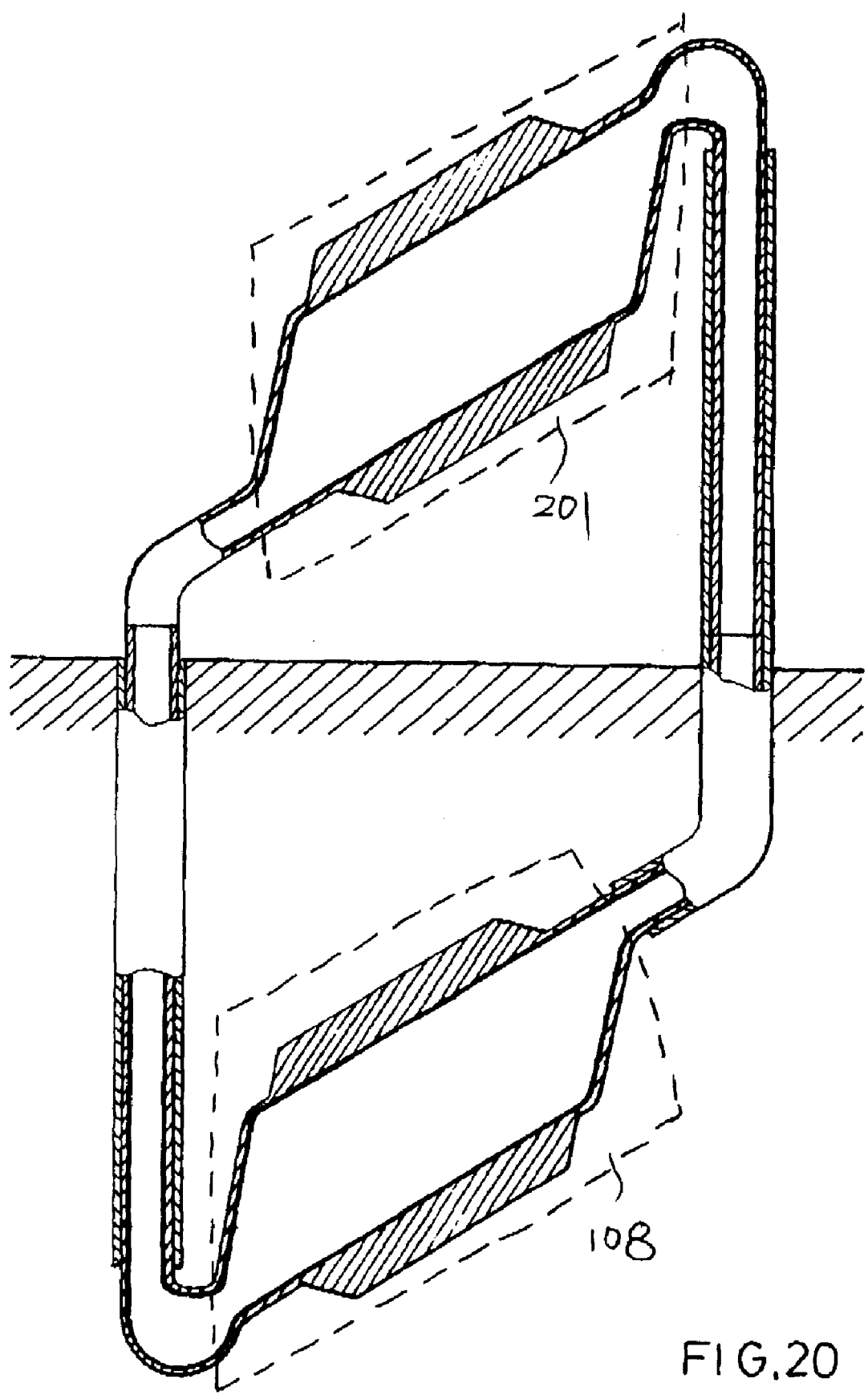
FIG. 20 is a sectional view taken from FIG. 19.

FIG. 19 is a perspective view of a structure of a closed heat release system of the present invention with the active heat actuator or the active heat releaser made of a conduction pipe in comparatively larger section of flow conduction; and FIG. 20 is a sectional view taken from FIG. 19. As illustrated in FIGS. 19 and 20, both of the active heat actuator 108 and the active heat releaser 201 may be comprised of one or more than one set of pipe structure in circular or any other geometric form in a comparatively larger fluid conduction section area to match the transmission pipeline to constitute a closed heat release system; multiple heat conduction fins 1001 may be provided externally to the active heat actuator 108 and the active heat releaser 201 as required, and multiple plate barriers to improve heat conduction and prevent inverse flow arranged alternatively at an upper inclination may be provided inside the active heat actuator 108 and the active heat releaser 201 as appropriately.

Figure 21:
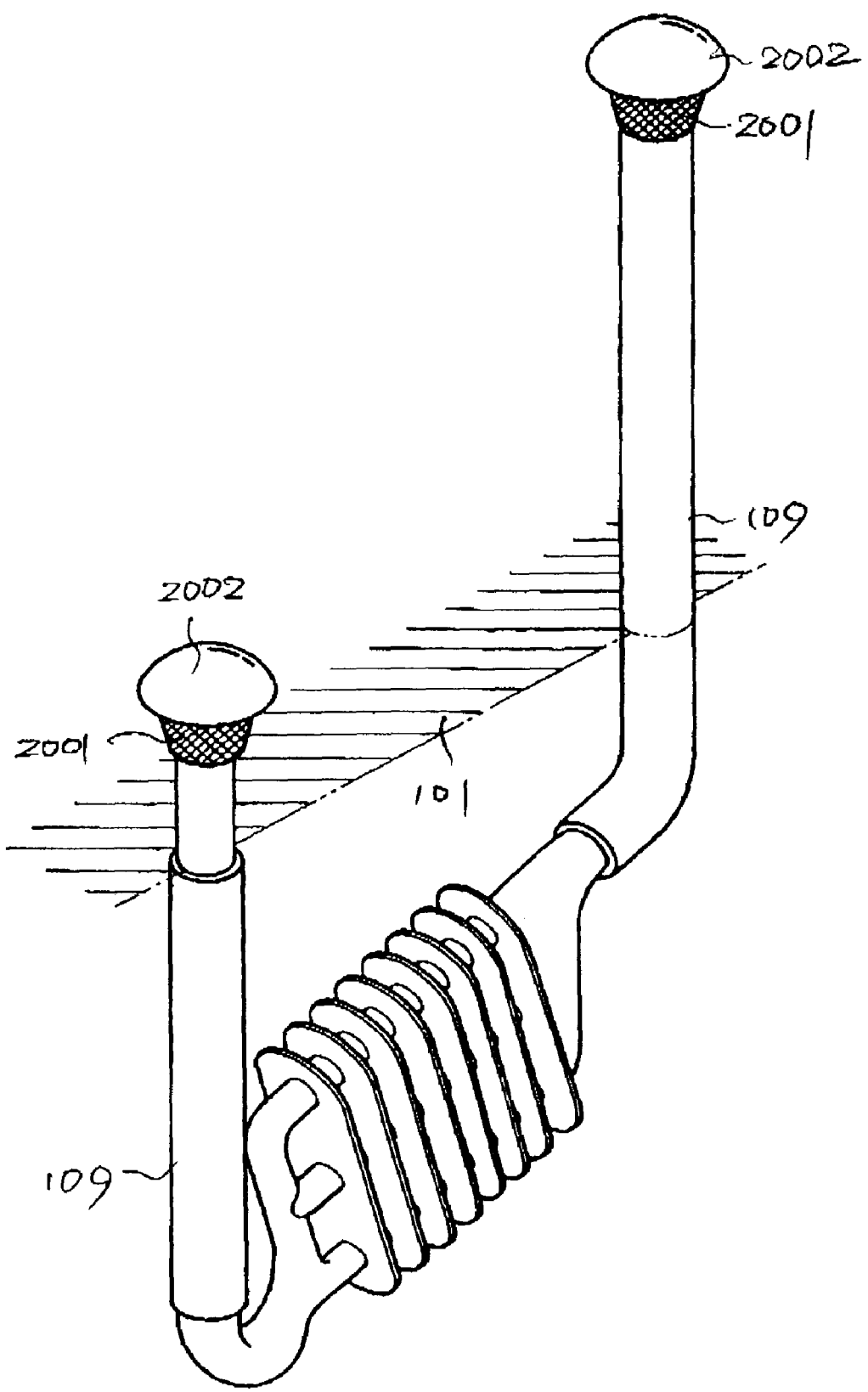
FIG. 21 is a schematic view of a structure of an open heat release system of the present invention with the active heat actuator indicating diverted flow in multiple pipes.
Figure 22:
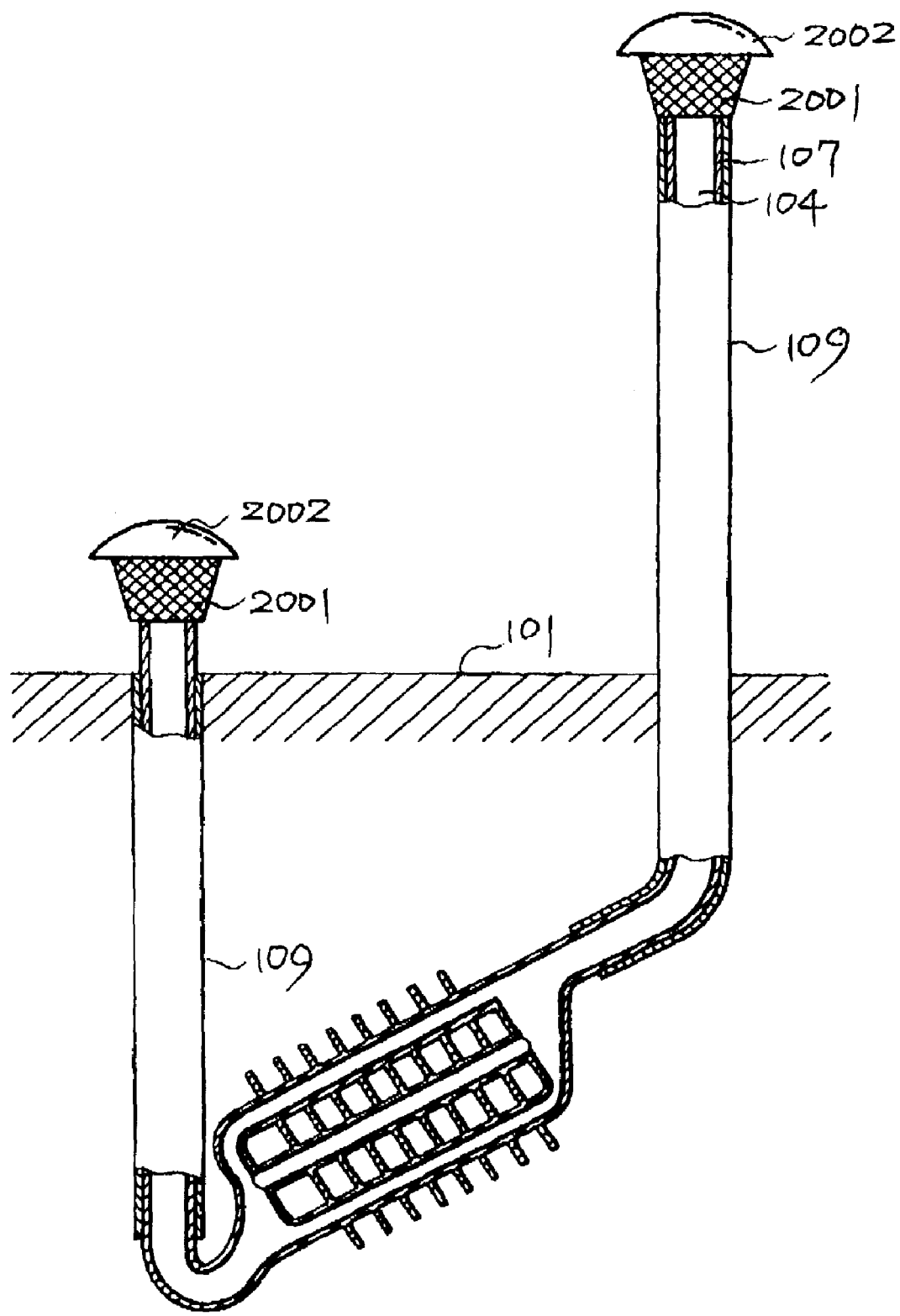
FIG. 22 is a sectional view taken from FIG. 21.

FIG. 21 is a schematic view of a structure of an open heat release system of the present invention with the active heat actuator indicating diverted flow in multiple pipes; and FIG. 22 is a sectional view taken from FIG. 21. As illustrated in FIGS. 21 and 22, the active heat actuator 108 may be comprised of one or more than one set of pipe structure in circular or any other geometric form indicating diverted flow of multiple pipes to match the transmission pipeline to constitute an open heat release system; multiple heat conduction fins 1001 may be provided externally to the active heat actuator 108 as required, and multiple plate barriers to improve heat conduction and prevent inverse flow arranged alternatively at an upper inclination may be provided inside the active heat actuator 108 as appropriately.

Figure 23:
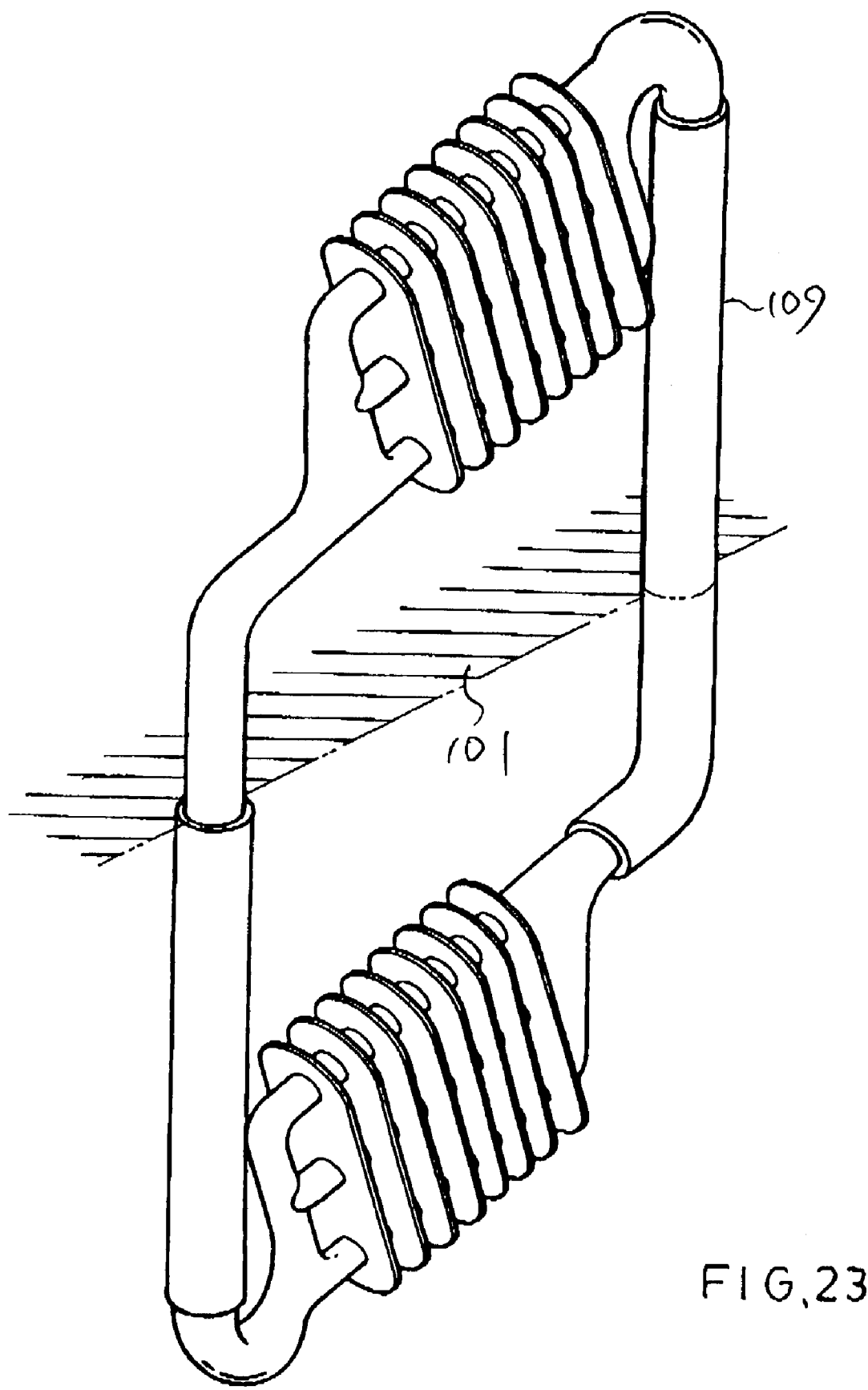
FIG. 23 is a schematic view of a structure of a closed heat release system of the present invention with the active heat actuator or the active heat releaser indicating diverted flow in multiple pipes.
Figure 24:
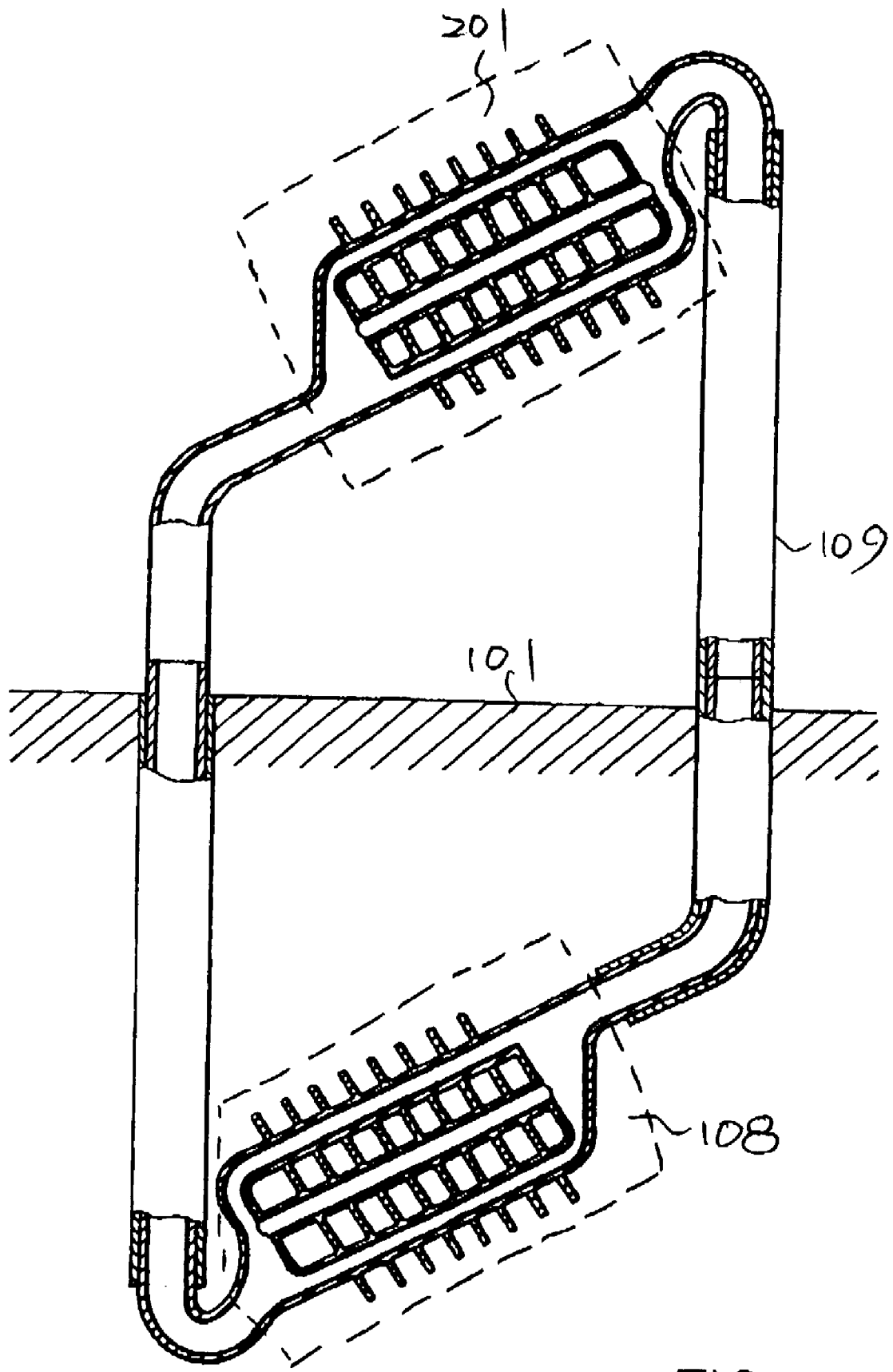
FIG. 24 is a sectional view taken from FIG. 23.

FIG. 23 is a schematic view of a structure of a closed heat release system of the present invention with the active heat actuator or the active heat releaser indicating diverted flow in multiple pipes; and FIG. 24 is a sectional view taken from FIG. 23. As illustrated in FIGS. 23 and 24, the active heat actuator 108 and the active heat releaser 201 may be comprised of one or more than one set of pipe structure in circular or any other geometric form indicating diverted flow of multiple pipes to match the transmission pipeline to constitute a closed heat release system; multiple heat conduction fins 1001 may be provided externally to the active heat actuator 108 and the active heat releaser 201 as required, and multiple plate barriers to improve heat conduction and prevent inverse flow arranged alternatively at an upper inclination may be provided inside the active heat actuator 108 and the active heat releaser 201 as appropriately.

The structure of the open heat actuation and release circulation system for the natural thermo-carrier heat release system as described above may be as illustrated in FIGS. 25 and 26 comprised of pipe structures in circular or any other geometric form in difference diameters and dimensions coupled to one another and a refractory structure or material is sandwiched by two pipe structures to form an open structure of fluid transmission pipeline with multiple layers of pipes including at least one set of transmission pipeline in smaller diameter to be inserted into the pipe in larger diameter. Wherein, a flow guide pipe 1309 is penetrated from the bottom of a closed end surface 1307 at the top of an inner tube of the transmission pipeline in smaller diameter into the wall of the outer pipe in larger diameter for introducing the fluid at comparatively lower temperature to descend and into the active heat actuator 108, and the fluid at comparatively higher temperature is ascending and discharged through the transmission pipeline in larger diameter. The bottoms respectively of those two transmission pipelines of different diameters are jointly connected to the active heat actuator 108 provided in the natural thermo-carrier 101 to constitute an open heat release system. Similarly, multiple heat conduction fins 1001 may be externally provided to the active heat actuator as required, or multiple plate barriers 1002 to prevent inverse flow are provided in the active heat actuator. The active heat actuator 108 provided in the natural thermo-carrier 101 is comprised of an outer pipe 1301 and a closed end surface 1302 at the bottom of the outer pipe 1301, and multiple heat conduction fins 1001 may be provide as required to the active heat actuator 108 to improve its heat conduction effect with the natural thermo-carrier. Inside the active heat actuator 108, one or more than one set of inner pipe 1303 in smaller diameter is provided and a flow guide spacing 1305 is provide in the inner space of the bottom 1304 of the inner pipe 1303 and the bottom of the outer pipe to admit the heat exchange fluid 104 at comparatively lower temperature to flow into the inner pipe 1303 to be heated and to flow upwardly through the outer pipe 1301 to form an open heat release system.

Figure 25:
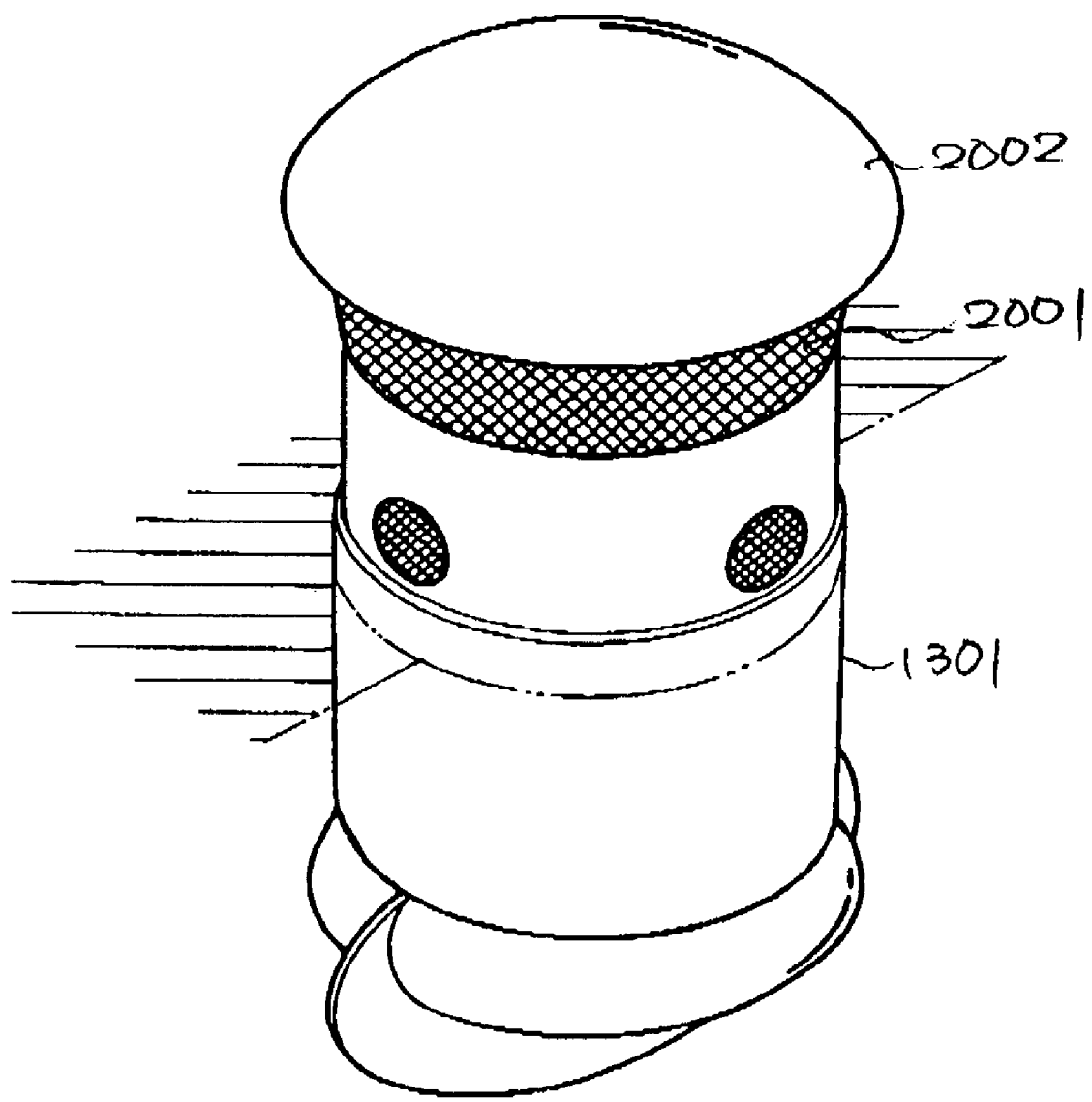
FIG. 25 is a perspective view of a structure of an open heat release system of the present invention with its heat exchange fluid of the active heat actuator 108 being comprised of multiple pipes in different diameters connected to one another.
Figure 26:
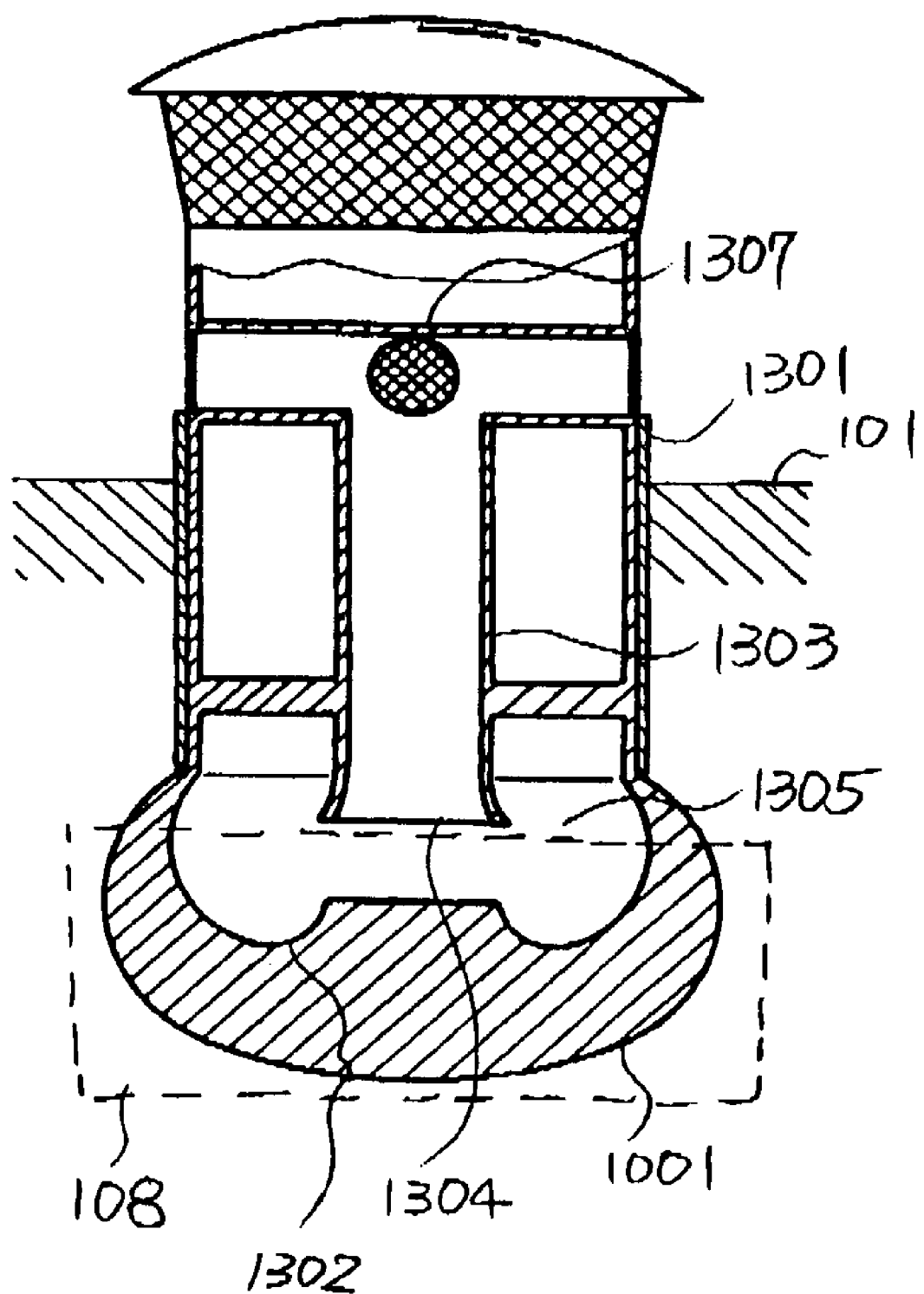
FIG. 26 is a sectional view taken from FIG. 25

FIG. 25 is a perspective view of a structure of an open heat release system of the present invention with its heat exchange fluid of the active heat releaser 108 being comprised of multiple pipes in different diameters connected to one another; and FIG. 26 is a sectional view taken from FIG. 25. The open structure of fluid transmission pipeline comprised of pipe structures in different diameters inserted to one another as illustrated in FIGS. 25 and 26 may further form a closed system as illustrated in FIGS. 27 and 28.

Figure 27:
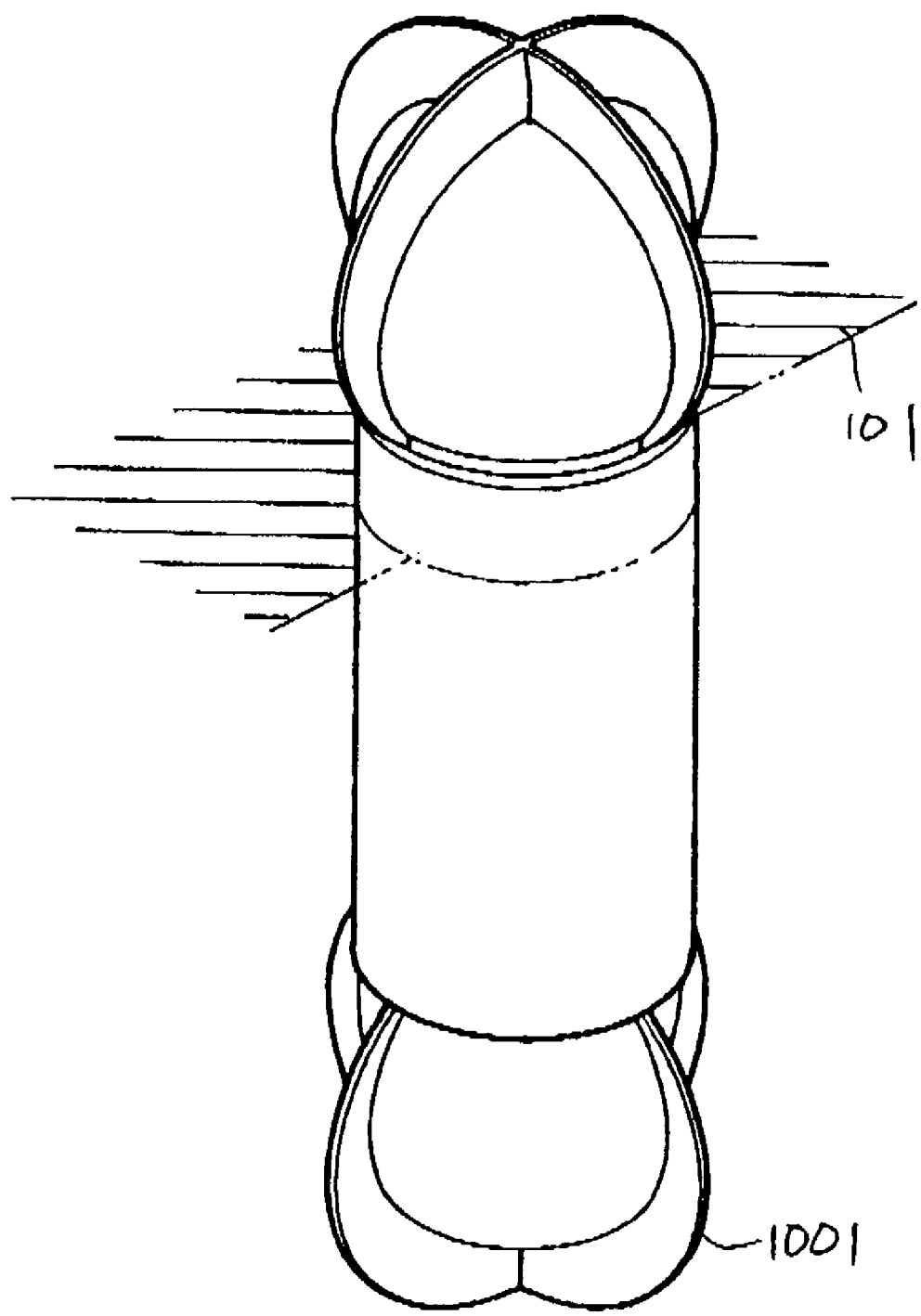
FIG. 27 is a perspective view of a structure of a closed open heat release system of the present invention with its heat exchange fluid of the active heat actuator 108 or the active heat releaser 201 being comprised of multiple pipes in different diameters connected to one another.
Figure 28:
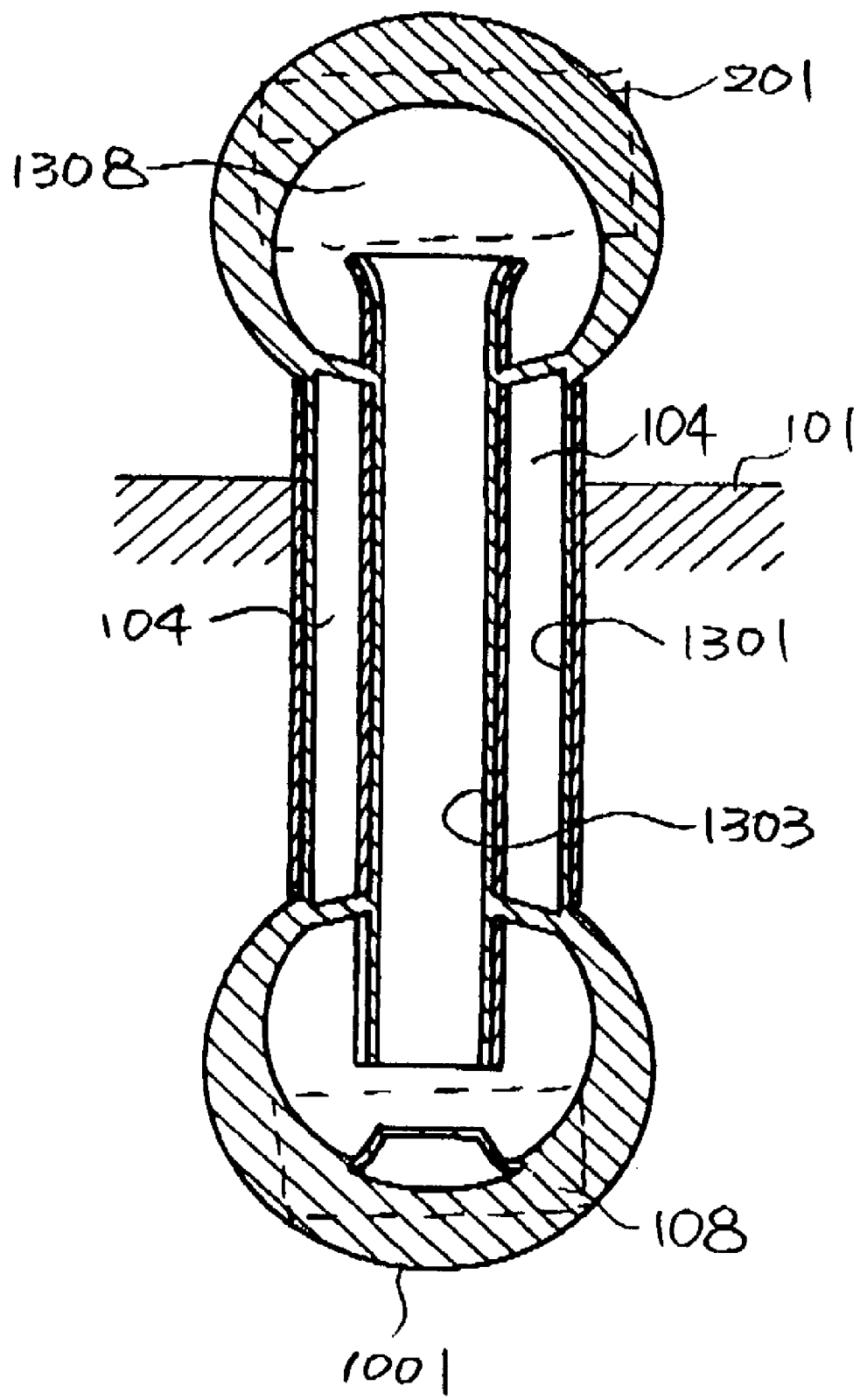
FIG. 28 is a sectional view taken from FIG. 27.

FIG. 27 is a perspective view of a structure of a closed open heat release system of the present invention with its heat exchange fluid of the active heat releaser 108 or the active heat releaser 201 being comprised of multiple pipes in different diameters connected to one another; and FIG. 28 is a sectional view taken from FIG. 27. As illustrated in FIGS. 27 and 28, the heat release system is essentially comprised of multiple pipe structures in circular or any other geometric form in difference diameters and dimensions coupled to one another and a refractory structure or material is sandwiched by two pipe structures to form an open structure of fluid transmission pipeline with multiple layers of pipes including at least one set of transmission pipeline in smaller diameter to be inserted into the pipe in larger diameter for introducing the fluid at comparatively lower temperature to descend and into the active heat actuator 108, and the fluid at comparatively higher temperature is ascending and discharged through the transmission pipeline in larger diameter. The bottoms respectively of those two transmission pipelines of different diameters are jointly connected to the active heat actuator 108 provided in the natural thermo-carrier 101, and the tops of those two transmission pipelines of different diameters are jointly connected to the active heat releaser 201 provided above them, and the active heat releaser 201 to release the heat to the object 103 with temperature delta is comprised of the outer pipe 1301 in larger diameter and a closed end surface 1306 at the top of the outer pipe 1301 while a flow guide pore passage 1308 is provided between one or more than one inner pipe 1303 in smaller diameter provided inside the active heat releaser 201 and the top 1310 of the inner pipe 1303 for the heat exchange fluid 104 at comparatively higher temperature to ascend along the inner pipe 1303 and when the temperature of the heat exchange fluid 104 drops after having released the heat, the heat exchange fluid 104 descends along the outer pipe 1301 and then ascends along the inner pipe 1303 to constitute a closed heat release system. Similarly, multiple heat conduction fins 1001 may be externally provided to the active heat actuator 108 and the active heat releaser 201 as required, or multiple plate barriers to prevent inverse flow are provided in the active heat actuator 108 and the active heat releaser 201.

The structure of the closed heat actuation and release circulation system of the natural thermo-carrier heat release system as described above may be as illustrated in FIGS. 29 and 30 comprised of having pipe structures in circular or any other geometric form penetrating in the loop pipe structure, a refractory structure is provided between both pipe structures or both pipe structures are made of refractory materials that provide thermo separation effect.

Figure 29:
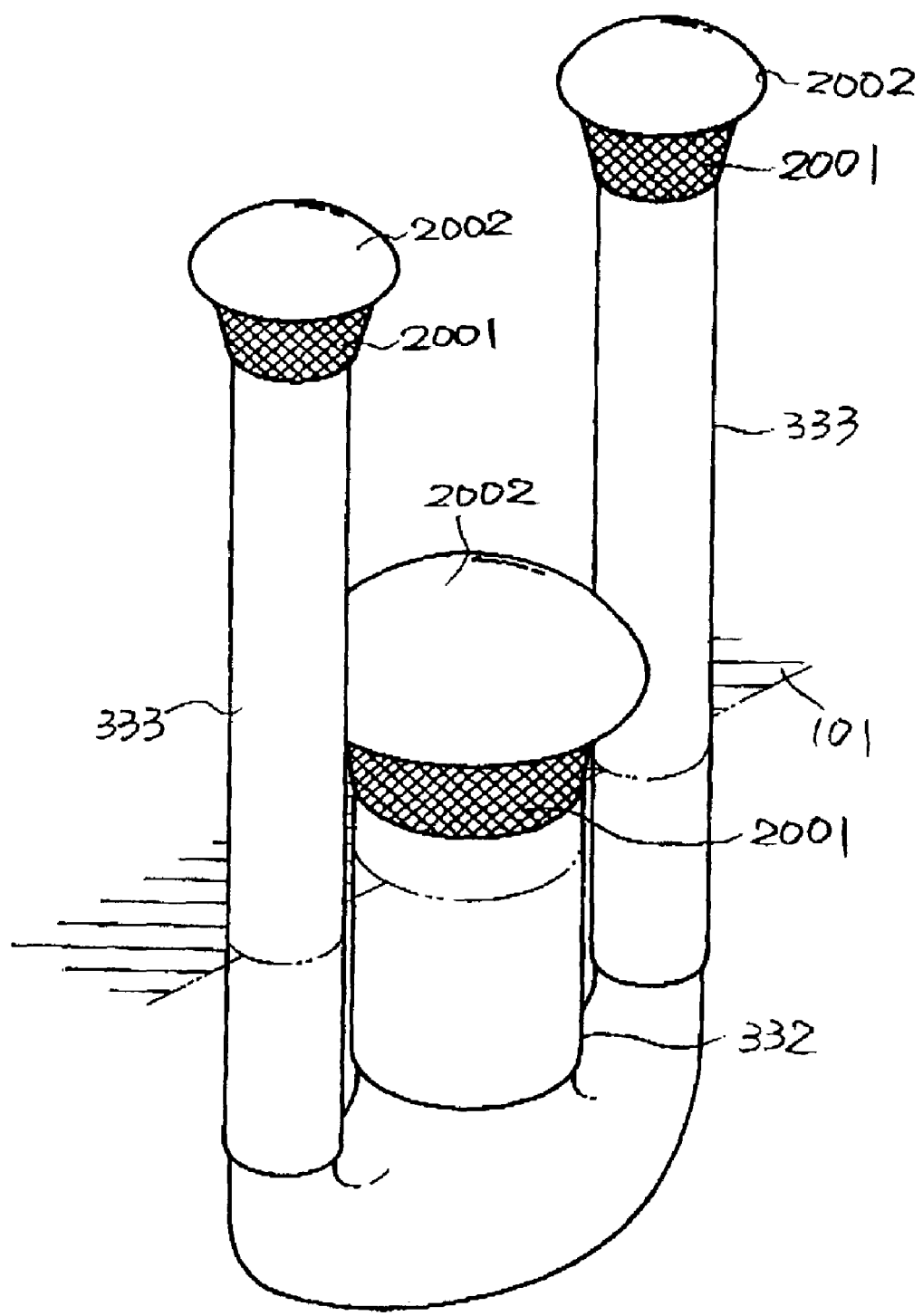
FIG. 29 is a perspective view of a as structure of an open heat release system with its active heat actuator 108 incorporated with transmission pipes in comparatively smaller diameter to penetrate through inner hole of transmission pipeline comprised of a loop pipe.
Figure 30:
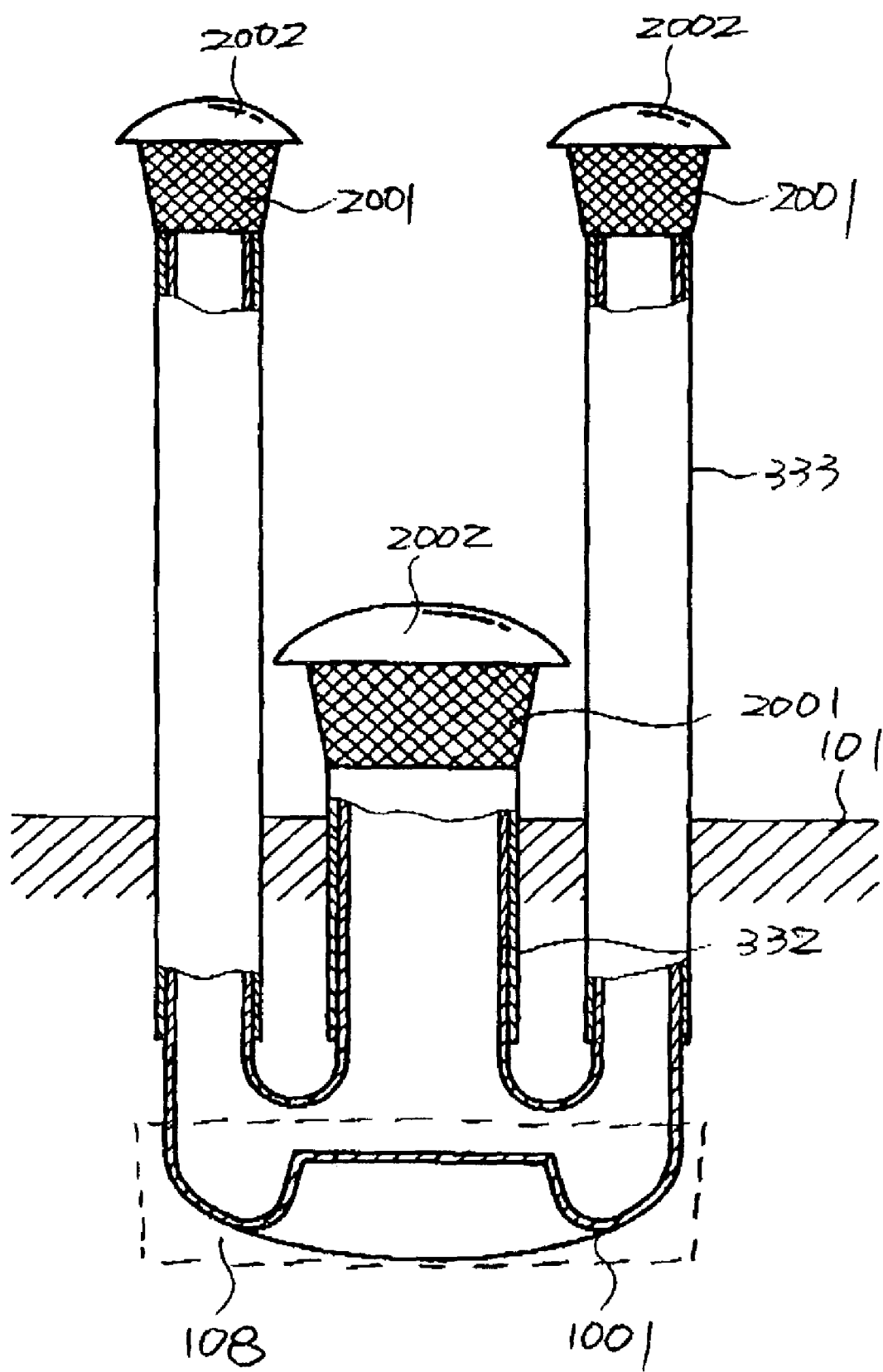
FIG. 30 is a sectional view taken from FIG. 29.

FIG. 29 is a perspective view of a as structure of an open heat release system with its active heat actuator 108 incorporated with transmission pipes in comparatively smaller diameter to penetrate through inner hole of transmission pipeline comprised of a loop pipe; and FIG. 30 is a sectional view taken from FIG. 29. As illustrated in FIGS. 29 and 30, the heat release system is essentially comprised of a transmission pipeline of pipe structure in circular or any other geometric form and another transmission pipeline of the loop pipe structure penetrated to each other provided with refractory effect. Wherein, at least one set of transmission pipeline 332 in smaller diameter is penetrated into the inner hole of a transmission pipeline 333 comprised of a structure of loop pipe. Both transmission pipelines 332, 333 may directly contact each other or a specific spacing is assigned to where between both transmission pipelines 332, 333. The transmission pipeline 332 in smaller diameter is provided for the object 102 with temperature delta at comparatively lower temperature to introduce the fluid at lower temperature to descend into the active heat actuator 108, and the transmission pipeline 333 comprised of a loop pipe structure is provided to guide the fluid at comparatively higher temperature as actuated by the active heat actuator 108 to the object 103 with temperature delta to receive the heat released. The bottoms of both types of transmission pipelines are jointly connected to the active heat actuator 108 provided in the natural thermo-carrier 101 to constitute the open release heat release system. Similarly, multiple heat conduction fins 1001 may be externally provided to the active heat actuator 108 as required, or multiple plate barriers to prevent inverse flow are provided in the active heat actuator 108.

Figure 31:
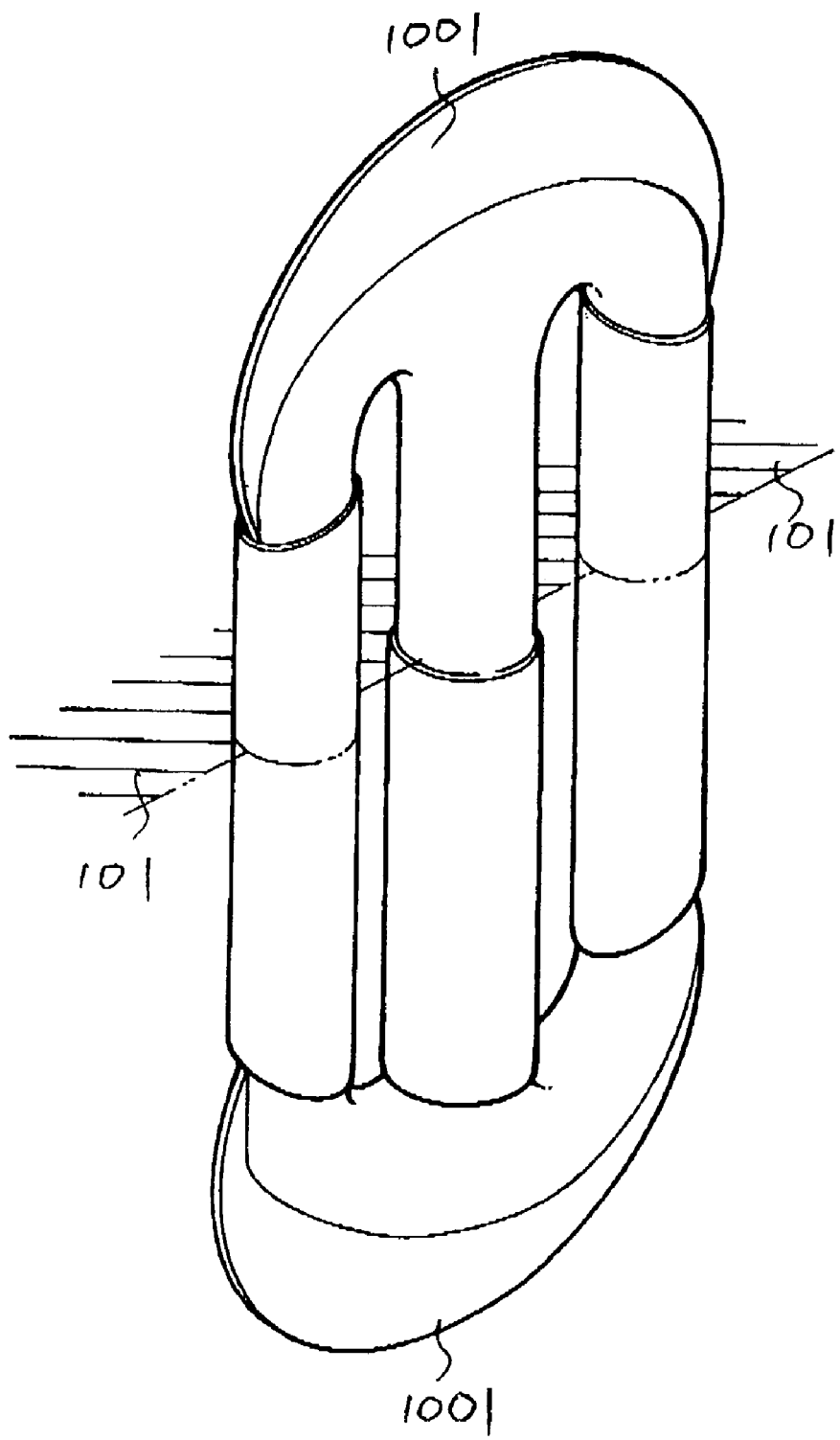
FIG. 31 is a perspective view of a structure of closed heat release system of the present invention having provided between the active heat actuator 108 and the active heat releaser 201 a common transmission pipeline comprised of a transmission pipeline made of pipes in comparatively smaller diameter penetrated into loop pipe.
Figure 32:
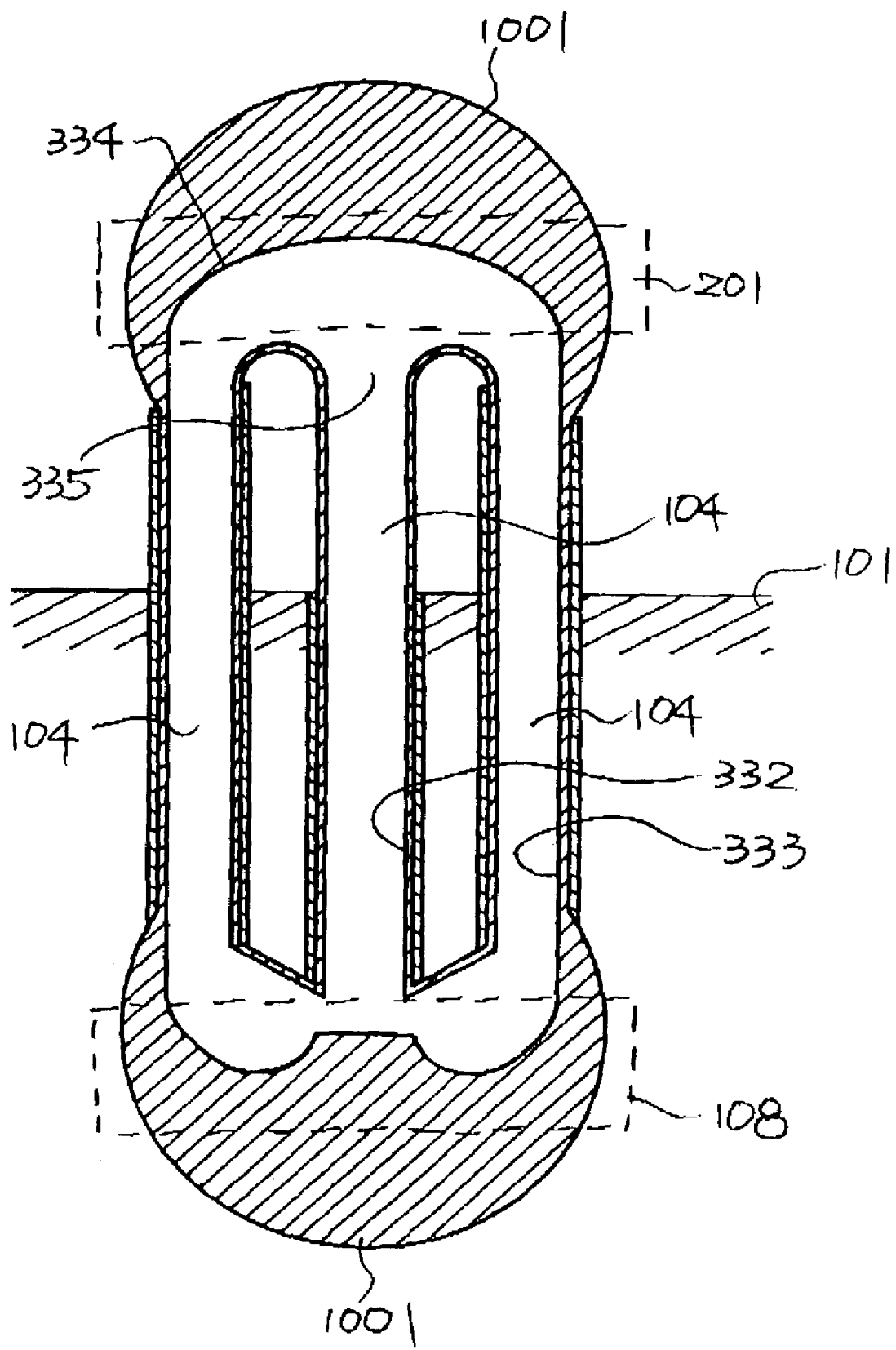
FIG. 32 is a sectional view taken from FIG. 31.

The open heat release system as illustrated in FIGS. 29 and 30 may be further comprised of a closed heat release system as illustrated in FIGS. 31 and 32.

FIG. 31 is a perspective view of a structure of closed heat release system of the present invention having provided between the active heat actuator 108 and the active heat releaser 201 a common transmission pipeline comprised of a transmission pipeline made of pipes in comparatively smaller diameter penetrated into loop pipe; and FIG. 32 is a sectional view taken from FIG. 31. As illustrated in FIGS. 31 and 32, the heat release system is essentially comprised of a transmission pipeline of pipe structure in circular or any other geometric form and another transmission pipeline of the loop pipe structure penetrated to each other provided with refractory effect. Wherein, at least one set of transmission pipeline 332 in smaller diameter is penetrated into the inner hole of a transmission pipeline 333 comprised of a structure of loop pipe. Both transmission pipelines 332, 333 may directly contact each other or a specific spacing, or a selected filling is assigned to where between both transmission pipelines 332, 333. A structure 109 with good refractory property is provided between both types of transmission pipelines 106 and the natural thermo-carrier 101 they contact, or both types of transmission pipelines are forthwith made of good refractory materials. The transmission pipeline 332 in smaller diameter is provided for the fluid at comparatively lower temperature to descend and be guided into the active heat actuator 108, and the transmission pipeline 333 comprised of a loop pipe structure is provided to guide the fluid at comparatively higher temperature as actuated by the active heat actuator 108 to the active heat releaser 201. The bottoms of both types of transmission pipelines are jointly connected to the active heat actuator 108 provided in the natural thermo-carrier 101 to constitute the open release heat release system, and the tops of two types of transmission pipelines are jointly connected to the active heat releaser 201 provided above. The active heat releaser 201 provided to release heat to the object 103 with temperature delta is formed by expansion of the closed end surface 334 at the top of the transmission pipeline 333 comprised of a structure loop pipe. The lower side of the active heat releaser 201 is connected to one or more than one set of the flow guide pore 335 in smaller diameters provided at the top of the transmission pipeline 332 for the heat exchange fluid 104 to descend and flow back to the active heat actuator 108 after having dropped its temperature as a result of releasing heat by the active heat releaser 201, thus to form the closed heat release system. Similarly, multiple heat conduction fins 1001 may be externally provided to the active heat actuator 108 and the active heat releaser 201 as required, or multiple plate barriers to prevent inverse flow are provided in the active heat actuator 108 and the active heat releaser 201.

Figure 33:
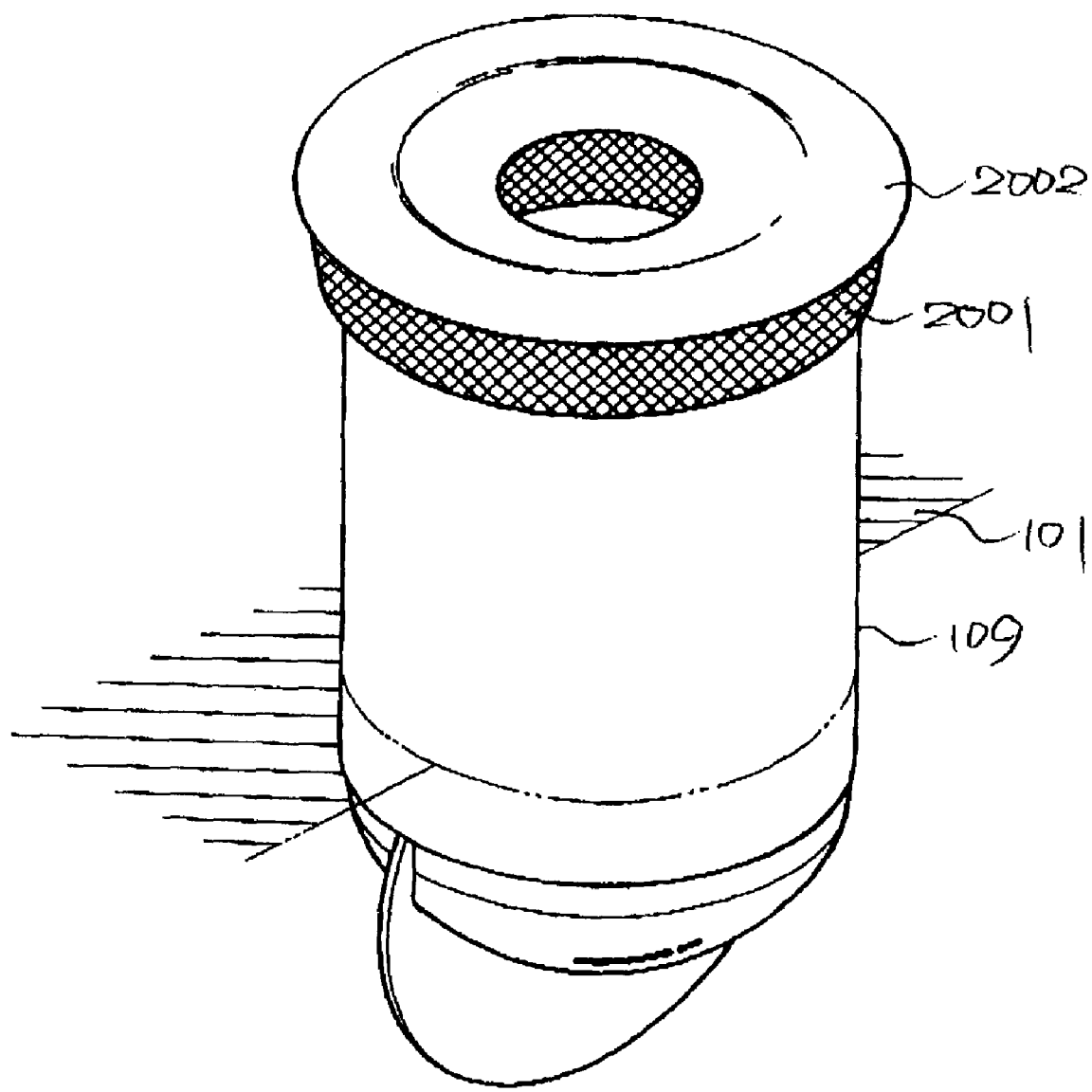
FIG. 33 is a perspective view of an open heat release system with the active heat actuator being comprised of multiple sets of pipes that are alternatively provided.
Figure 34:
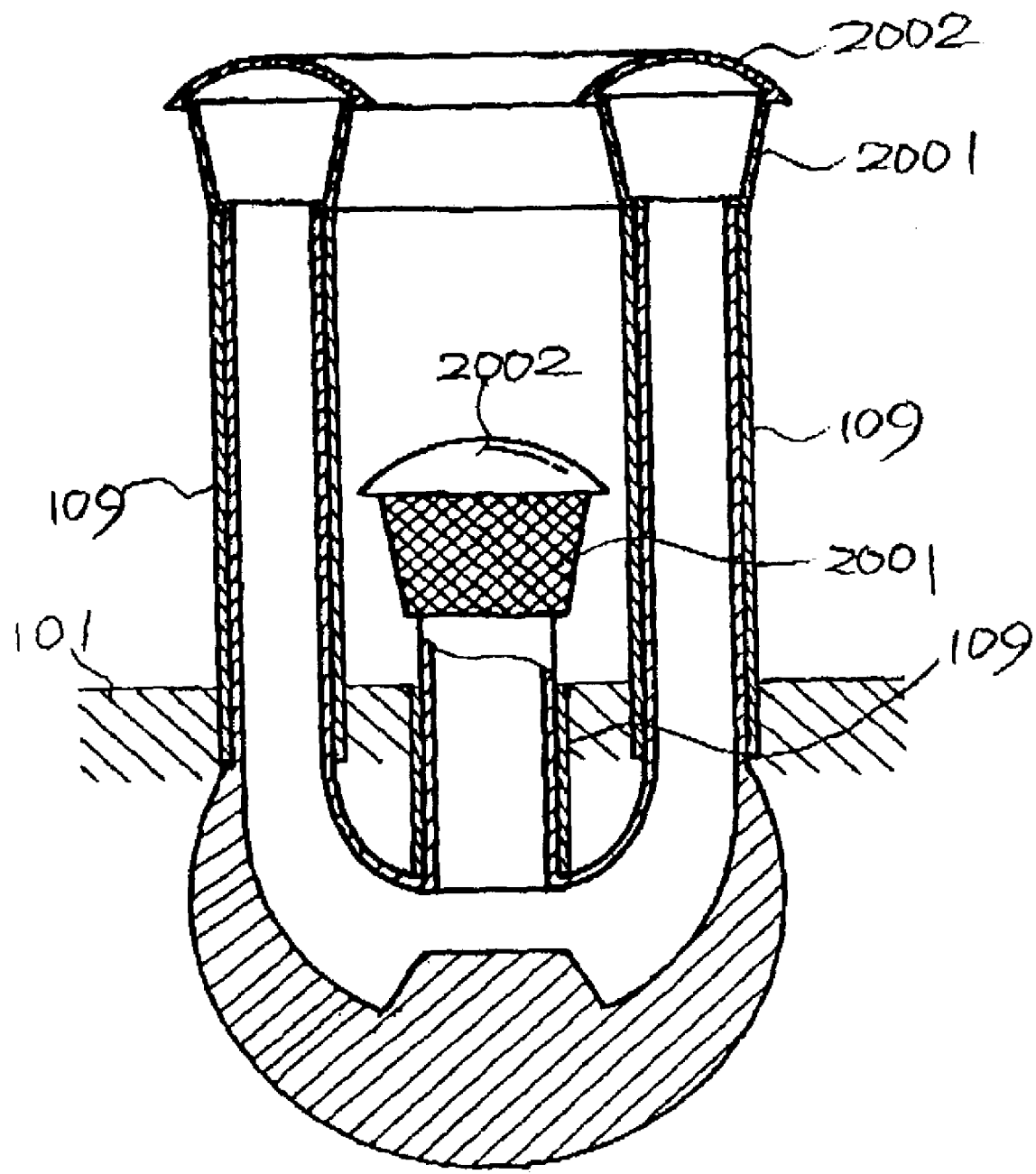
FIG. 34 is a sectional view taken from FIG. 33.

The natural thermo-carrier heat release system may be further related to an open or closed heat release system comprised of alternatively provided pipe structures in circular or any other geometric form. FIG. 33 is a perspective view of an open heat release system with the active heat actuator being comprised of multiple sets of pipes that are alternatively provided; and FIG. 34 is a sectional view taken from FIG. 33. As illustrated in FIGS. 33 and 34, the natural thermo-carrier heat release system may be provided in an open structure of open fluid transmission pipeline comprised of alternatively provided multiple sets of pipe structures in circular or any other geometric form in identical size or different sizes including at least one set of fluid transmission pipeline with a comparatively lower inlet provided for the fluid at comparatively lower temperature to descend and to be guided into, and at least one set of fluid transmission pipeline with a comparatively higher outlet provided for the fluid at comparatively higher temperature to ascend and to be discharge. A structure 109 with good refractory property is provided between both types of transmission pipelines 106 and the natural thermo-carrier 101 they contact, or both types of transmission pipelines are forthwith made of good refractory materials.

The bottoms of both types of transmission pipelines are jointly connected to the active heat actuator 108 provided in the natural thermo-carrier 101 to constitute the open release natural thermo-carrier heat release system. Similarly, multiple heat conduction fins 1001 may be externally provided to the active heat actuator 108 as required, or multiple plate barriers to prevent inverse flow are provided in the active heat actuator 108.

The multiple sets of pipe structure as illustrated in FIGS. 33 and 34 may be further related to a closed structure of fluid transmission pipeline.

Figure 35:
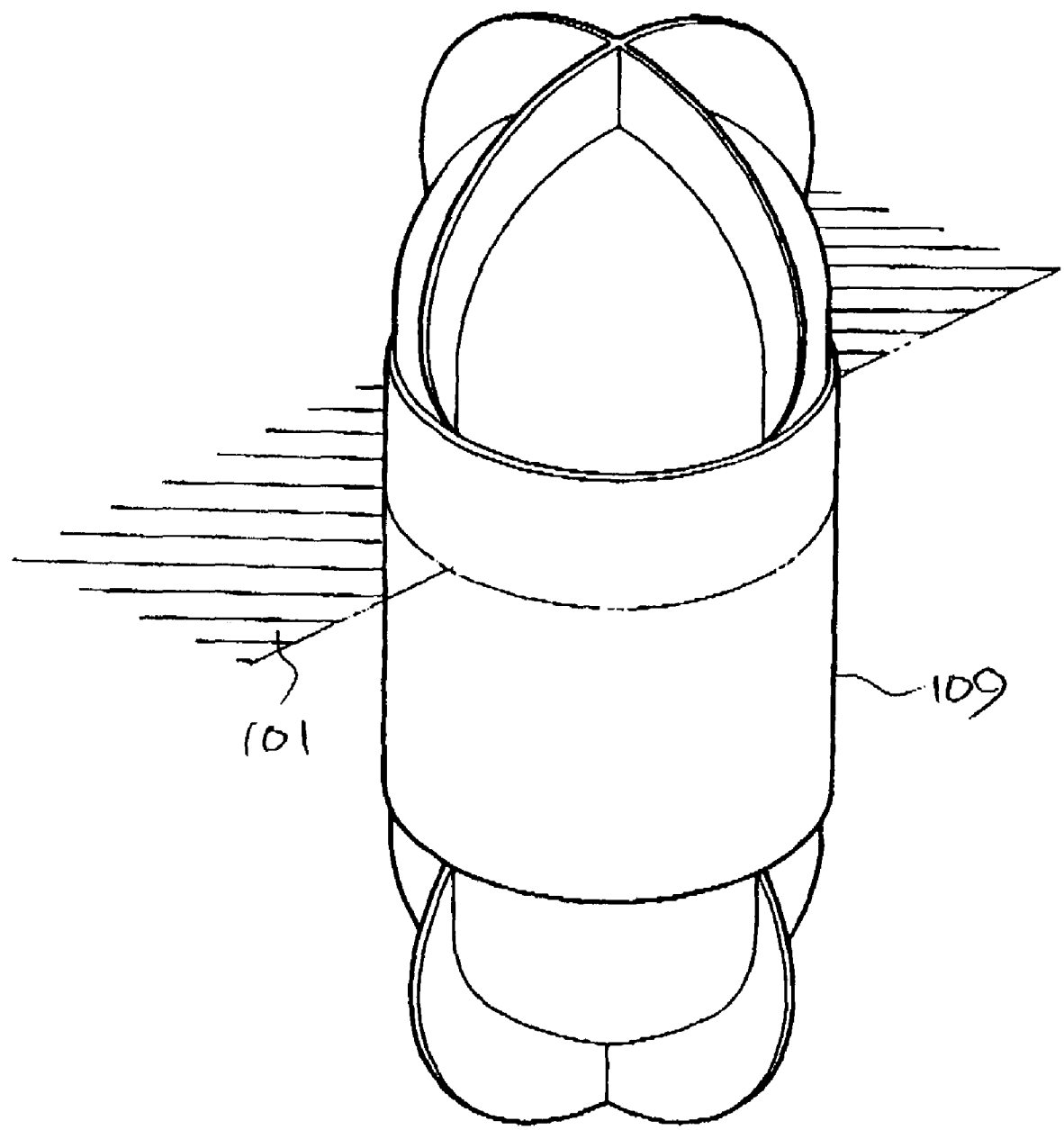
FIG. 35 is a perspective view of a closed heat release system with the active heat actuator being comprised of multiple sets of pipes that are alternatively provided.
Figure 36:
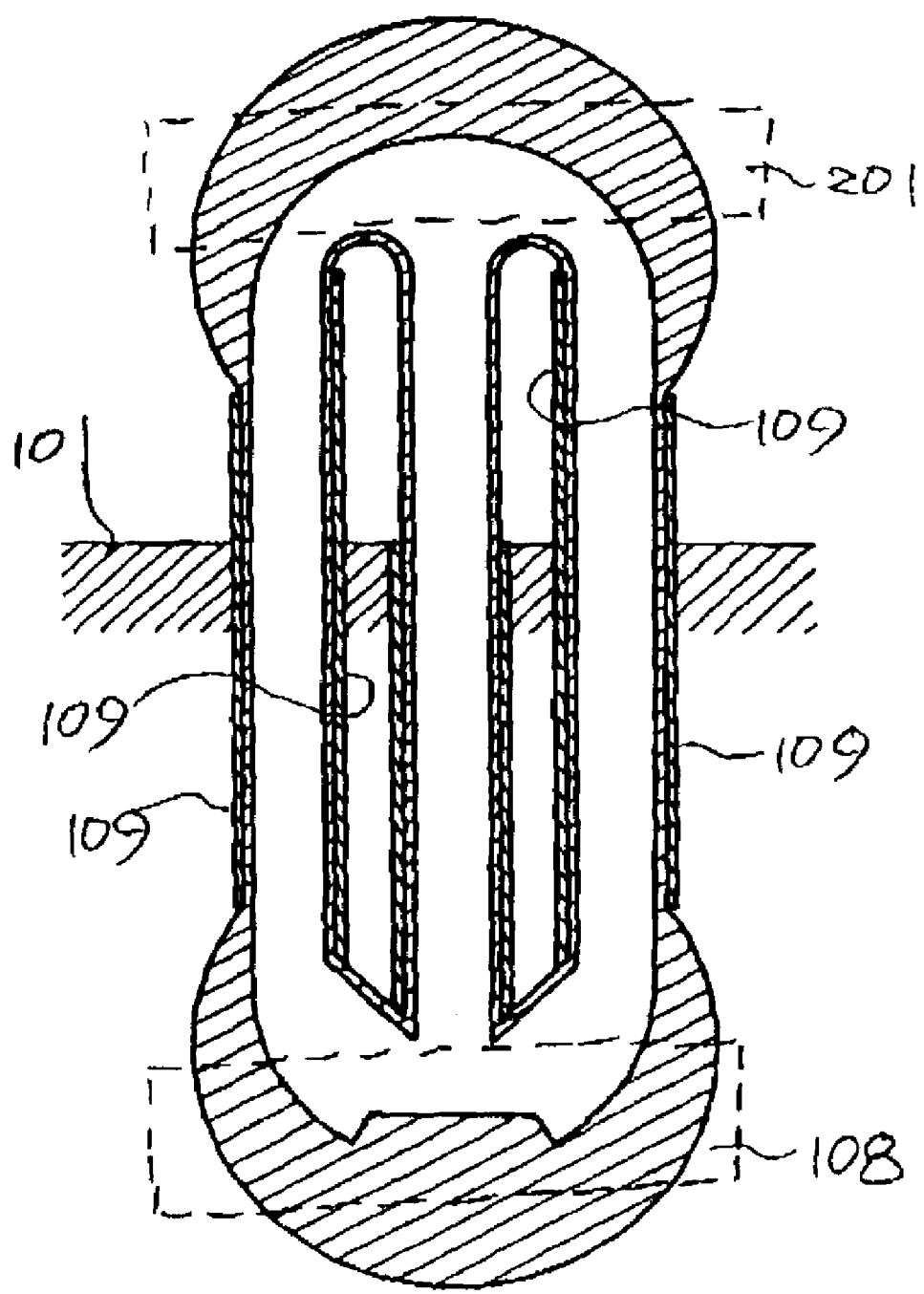
FIG. 36 is a sectional view taken from FIG. 35.

FIG. 35 is a perspective view of a closed heat release system with the active heat actuator being comprised of multiple sets of pipes that are alternatively provided; and FIG. 36 is a sectional view taken from FIG. 35. As illustrated in FIGS. 35 and 36, a closed heat release system of transmission pipelines comprised of multiple sets of pipe structures alternatively provided and incorporated to the active heat actuator and the active heat releaser. The essential structures include multiple transmission pipelines in circular or any other geometric form in the identical size or different sizes, the active heat actuator 108 and the active heat releaser 201. Wherein, at least one set of fluid transmission pipeline with a flow guide inlet provided at lower location for the fluid at comparatively lower temperature introduced by the object 102 with temperature delta to descend and be guided into the active heat actuator 108, and at least one set of fluid transmission pipeline with an outlet provided at higher location for the fluid at comparatively higher temperature heated by the active heat actuator 108 to ascend and be guided to the active heat releaser 201 to release the heat to the object 103 with a temperature delta. A structure 109 with good refractory property is provided between both types of transmission pipelines 106 and the natural thermo-carrier 101 they contact, or both types of transmission pipelines are forthwith made of good refractory materials. The bottoms of both types of transmission pipelines are jointly connected to the active heat actuator 108 provided in the natural thermo-carrier 101 and their tops are jointly connected to the active heat releaser 201 provide above to constitute the close release natural thermo-carrier heat release system. Similarly, multiple heat conduction fins 1001 may be externally provided to the active heat actuator as required, or multiple plate barriers to prevent inverse flow are provided in the active heat actuator.

Either the active heat actuator 108 or the active heat releaser 201 may be given a specific type of structure as appropriately and may be comprised of the structures of same geometric form, or mixed with other structures in different geometric form.

When the heat release system of the present invention is put in practical use, the following optional items may be further provided for the purposes of control and regulation:

- a flow meter: an optional item to count the accumulated flow volume;
- a filtration device 2001: an optional item comprised of strainer and hazardous fluid filtration element, installed at the fluid inlet or outlet to prevent the pipeline from blocking and to clean the pipeline;
- a protection hood structure 2002: to be provided at the outlet or inlet of the transmission pipeline with least interference to the flow of the heat exchange fluid, and is provided when the transmission pipe is vertically provided or provided at an upward inclination to prevent storm water or falling of foreign matters;

a flow regulation valve: an optional item to control by manual or by mechanical powers the volume of the fluid to be released;

a humidity regulation device or humidity disposal structure: an optional item comprised of a humidity detection device or a set of discharge pumps, or a humidity or water accumulation disposal structure that is provided with discharge hole way; and a control unit: comprised of a dynamo-electric or a solid-state electronic circuit and related software to control fluid temperature, volume and humidity including control of fluid volume, valve control and monitor of fluid temperature, control of fluid pumps and safety protection control, detection of hazardous fluid at the import side or each export outlet, triggering off the alarm to cut off the fluid or provide other reaction in the presence of hazardous fluid at a lever challenging the preset value.

In the practical applications, the heat exchange fluid referred in the natural thermo-carrier heat release system of the present invention includes a gas or a liquid, and the object 102 with temperature delta and another object 103 also with temperature delta to receive the heat released include:

(1) an air conditioning space within a fixed building, e.g., a building, greenhouse, or public building;

(2) a space demanding air conditioning in a structure moving on a flowing natural thermo-carrier, e.g., a sea vessel, floating working platform, or a building on surface; or (3) an open space accommodating gas or liquid, e.g., a pond, valley, basin, or desert; or (4) a closed container for gas or liquid, e.g., air tank or liquid container; or (5) any manufacturing or processing equipment; or (6) any mechanical equipment or home electric appliances that requires passive prevention of freezing or active defrosting; or (7) any open road or airfield runway or surface navigation way that requires passive prevention of freezing or active defrosting; or (8) any surface and deeper layer provided with temperature delta in a water way of sea port, lake, or river; and (9) any site with specific geologic features, e.g., a desert and it surrounding environment.

Furthermore, the following expansion and additional auxiliary systems may be provided to the natural thermo-carrier heat release system:

1. When required by the site or on consideration of economic benefits, a fluid actuated turbo may be provided to the outlet of the heat exchange fluid to generate rotary kinetic output to drive a power generator or other loads;

2. If functional boost or effect support is required, an auxiliary fluid pump may be provided to the inlet, the outlet or the flow passage of the heat actuated convection device that includes the pump actuated by the flowing kinetics from the natural environment, or by solar generator; or driven by another fluid pump operating on auxiliary power;

3. Again if functional boost or effect support is required, a heating element to heat the fluid may be provided in the heat actuated convection device as appropriately;

4. Hand rest, stairs and railings arranged vertically may be provided inside the downward import fluid transmission pipeline 106 and the upward export fluid transmission pipeline 107;

5. Ladder may be provided to both of the downward import fluid transmission pipeline 106 and the upward export fluid transmission pipeline 107 and both fluid transmission pipelines may be of structures at a certain inclination; and 6. Protection screen and hood may be provided to the outlet of the upward export fluid transmission pipeline 107 and the inlet to the downward import fluid transmission pipeline 106.

The natural thermo-carrier heat release system of the present invention utilizes the natural heat resources from the natural thermo-carrier to improve the environmental condition and provide other applications is innovative, practical and provided with specific functions. Therefore, this application for a patent is duly filed accordingly.

The invention claimed is:

1. A natural thermo-carrier heat release system for a fluid disposed adjacent to a solid or liquid heat sink thermo-carrier, which may be of stratum, geodetic surface, pond, lake, river, desert, iceberg, or ocean; the heat release system comprising:

an active heat actuator disposed partially within the solid or liquid thermo-carrier and partially within the fluid;

the active heat actuator comprising a fluid transmission pipeline including two open ends both immersed in the fluid and connecting through a portion of the pipeline within the thermo-carrier, such that the fluid can flow into one of the open ends and out of the other of the open ends, meanwhile passing through the portion of the pipeline within the thermo-carrier;

wherein the pipeline includes two riser portions leading respectively between the two open ends and the portion of the pipeline within the thermo-carrier; and wherein the two opens ends are disposed in the fluid at two different elevations;

a good heat insulating function is provided between said transmission pipeline and said natural thermo-carrier;

wherein the natural thermo-carrier heat release system lacks any motor or pump, whereby a natural convection function is produced by an action of descending at lower temperature and ascending at higher temperature of the fluid for the fluid to be transported from an outlet open end of the transmission pipeline.

2. The natural thermo-carrier heat release system as claimed in claim 1, wherein at least one of the open ends comprises a filtration device.

3. The natural thermo-carrier heat release system as claimed in claim 1, wherein at least one of the open ends comprises a filtration hood structure.

4. The natural thermo-carrier heat release system as claimed in claim 1, wherein two of the open ends are separated to produce the natural convection.

5. The natural thermo-carrier heat release system as claimed in claim 1, wherein the portion of the pipeline within the thermo-carrier comprises an inclined portion disposed between a lower end thereof communicating with a first one of the riser portions leading to a lower one of the two open ends, and an upper end thereof communicating with a second one of the riser portions leading to an upper one of the two open ends.

6. The natural thermo-carrier heat release system as claimed in claim 5, wherein the two riser portions are substantially equal in height.

7. The natural thermo-carrier heat release system as claimed in claim 5, wherein the risers comprise heat-insulating structures.

8. The natural thermo-carrier heat release system as claimed in claim 5, wherein the inclined portion has a generally helical shape.

9. The natural thermo-carrier heat release system as claimed in claim 5, wherein the inclined portion has a generally waved shape.

10. The natural thermo-carrier heat release system as claimed in claim 1, wherein the fluid is a gas.

11. The natural thermo-carrier heat release system as claimed in claim 1, wherein the fluid is a liquid.

* * * * *